US008933925B2

(12) United States Patent
Sinha et al.

(10) Patent No.: US 8,933,925 B2
(45) Date of Patent: Jan. 13, 2015

(54) PIECEWISE PLANAR RECONSTRUCTION OF THREE-DIMENSIONAL SCENES

(75) Inventors: Sudipta Narayan Sinha, Redmond, WA (US); Drew Edward Steedly, Redmond, WA (US); Richard Stephen Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 12/484,909

(22) Filed: Jun. 15, 2009

(65) Prior Publication Data

US 2010/0315412 A1    Dec. 16, 2010

(51) Int. Cl.
*G06T 15/00* (2011.01)
*G06T 7/00* (2006.01)

(52) U.S. Cl.
CPC .............. *G06T 7/0065* (2013.01); *G06T 15/00* (2013.01)
USPC ........... 345/419; 345/420; 345/426; 345/427; 345/552; 382/154

(58) Field of Classification Search
USPC ......... 345/419, 420, 422, 427, 421, 552, 426; 382/154
See application file for complete search history.

(56) References Cited

U.S. PATENT DOCUMENTS

| 5,432,712 | A | | 7/1995 | Chan |
| 6,052,124 | A | * | 4/2000 | Stein et al. ..................... 345/419 |
| 6,351,572 | B1 | | 2/2002 | Dufour |
| 6,526,166 | B1 | | 2/2003 | Gorman |
| 7,130,484 | B2 | | 10/2006 | August |
| 8,121,350 | B2 | * | 2/2012 | Klefenz ........................ 382/104 |
| 8,675,049 | B2 | | 3/2014 | Kopf et al. |
| 2001/0053284 | A1 | | 12/2001 | Shin |
| 2002/0158873 | A1 | | 10/2002 | Williamson |
| 2004/0059708 | A1 | | 3/2004 | Dean et al. |
| 2004/0196282 | A1 | * | 10/2004 | Oh ................................ 345/419 |
| 2005/0081161 | A1 | | 4/2005 | MacInnes et al. |
| 2006/0005114 | A1 | | 1/2006 | Williamson et al. |

(Continued)

FOREIGN PATENT DOCUMENTS

| WO | 03042925 A1 | 5/2003 |
| WO | 2008156450 A1 | 12/2008 |
| WO | 2014025627 | 2/2014 |

OTHER PUBLICATIONS

Micusik et al. Multi-view Superpixel Stereo in Man-Made Environments. Published 2008.*

(Continued)

*Primary Examiner* — Kimbinh T Nguyen
(74) *Attorney, Agent, or Firm* — Steven Spellman; Peter Taylor; Micky Minhas

(57) ABSTRACT

Methods, systems, and computer-readable media for reconstruction a three-dimensional scene from a collection of two-dimensional images are provided. A computerized reconstruction system executes computer vision algorithms on the collection of two-dimensional images to identify candidate planes that are used to model visual characteristics of the environment depicted in the two-dimensional images. The computer vision algorithms may minimize an energy function that represents the relationships and similarities among features of the two-dimensional images to assign pixels of the two dimensional images to planes in the three dimensional scene. The three-dimensional scene is navigable and depicts viewpoint transitions between multiple two-dimensional images.

18 Claims, 26 Drawing Sheets

(56) References Cited

U.S. PATENT DOCUMENTS

| | | | |
|---|---|---|---|
| 2006/0023927 | A1 | 2/2006 | Zhawg et al. |
| 2006/0120594 | A1 | 6/2006 | Kim |
| 2006/0132482 | A1 | 6/2006 | Oh |
| 2007/0076016 | A1 | 4/2007 | Agarwala |
| 2007/0211149 | A1 | 9/2007 | Burtnyk et al. |
| 2007/0236561 | A1 | 10/2007 | Anai et al. |
| 2008/0071559 | A1 | 3/2008 | Arrasvuori |
| 2008/0137989 | A1 | 6/2008 | Ng |
| 2008/0144968 | A1 | 6/2008 | Cohen et al. |
| 2008/0247668 | A1 | 10/2008 | Li |
| 2008/0285843 | A1* | 11/2008 | Lim ............................... 382/154 |
| 2009/0244062 | A1 | 10/2009 | Steedly et al. |
| 2009/0254820 | A1 | 10/2009 | Farouki et al. |
| 2009/0259976 | A1 | 10/2009 | Varadhan et al. |
| 2010/0045703 | A1 | 2/2010 | Kornmann et al. |
| 2010/0045816 | A1 | 2/2010 | Rhoads |
| 2010/0080411 | A1 | 4/2010 | Deliyannis |
| 2010/0085383 | A1 | 4/2010 | Cohen et al. |
| 2010/0201682 | A1* | 8/2010 | Quan et al. .................... 345/419 |
| 2010/0315412 | A1 | 12/2010 | Sinha et al. |
| 2011/0035289 | A1 | 2/2011 | King et al. |
| 2011/0061011 | A1 | 3/2011 | Hoguet |
| 2011/0244919 | A1 | 10/2011 | Aller et al. |
| 2012/0314040 | A1 | 12/2012 | Kopf et al. |

OTHER PUBLICATIONS

Liu et al. Plane-Based Optimization for 3D Object Reconstruction from Single Line Drawings. IEEE 2008.*
Barinova et al. "Fast automatic single-view 3D reconstruction of urban scenes". Published 2008.*
Pollefeys et al. "Detailed Real-Time Urban 3D Reconstruction From Video". Published Oct. 2007.*
Cornelis et al. "3D Urban Scene Modeling Integrating Recognition and Reconstruction". Published 2008.*
Barinova et al. "Fast Automatic Single-View 3-d Reconstruction of Urban Scenes", Aug. 2008.*
Pollefeys et al. "Dtailed Real-Time Urban 3D Reconstruction from Video", Mar. 20, 2007.*
C. Baillard and A. Zisserman. A plane-sweep strategy for the 3d reconstruction of buildings from multiple images. In ISPRS Journal of Photogrammetry and Remote Sensing, pp. 56-62, 2000.
S. Baker, R. Szeliski, and P. Anandan. A layered approach to stereo reconstruction. CVPR, 0:434, 1998.
A. Bartoli. A random sampling strategy for piecewise planar scene segmentation. Computer Vision Image Understanding, 105(1):42-59, 2007.
S. Birchfield and C. Tomasi. Multiway cut for stereo and motion with slanted surfaces. In ICCV, pp. 489-495, 1999.
Y. Boykov, O. Veksler, and R. Zabih. Fast approximate energy minimization via graph cuts. In ICCV (1), pp. 377-384, 1999.
H. Chen, P.Meer, and D E. Tyler. Robust regression for data with multiple structures. In in 2001 IEEE Conference on Computer Vision and Pattern Recognition, vol. I, pp. 1069-1075, 2001.
R. T. Collins. A space-sweep approach to true multi-image matching. In CVPR, pp. 358-363, 1996.
N. Cornelis, K. Cornelis, and L. V. Gool. Fast compact city modeling for navigation pre-visualization. CVPR, 2:1339-1344, 2006.
P. Debevec, Y. Yu, and G. Borshukov. Efficient viewdependent image-based rendering with projective texturemapping. In in 9th Eurographics Rendering Workshop, pp. 105-116, 1998.
M. A. Fischler and R. C. Bolles. Random sample consensus: a paradigm for model fitting with applications to image analysis and automated cartography. Commun. ACM, 24(6):381-395, 1981.
F. Fraundorfer, K. Schindler, and H. Bischof. Piecewise planar scene reconstruction from sparse correspondences. Image Vision Comput., 24(4):395-406, 2006.
Y. Furukawa and J. Ponce. Accurate, dense, and robust multiview stereopsis. In CVPR, pp. 1-8, 2007.
D. Gallup, J.-M. Frahm, P. Mordohai, Q. Yang, and M. Pollefeys. Real-time plane-sweeping stereo with multiple sweeping directions. CVPR, 0:1-8, 2007.
M. Goesele, N. Snavely, B. Curless, H. Hoppe, and S. M. Seitz. Multi-view stereo for community photo collections. In ICCV, 2007.
M. Habbecke and L. Kobbelt. Iterative multi-view plane fitting. In in VMV06, pp. 73-80, 2006.
D. Hoiem, A. A. Efros, and M. Hebert. Automatic photo pop-up. In SIGGRAPH, Aug. 2005.
V. Kolmogorov and R. Zabih. Multi-camera scene reconstruction via graph cuts. In ECCV, pp. 82-96, 2002.
M. Lhuillier and L. Quan. Edge-constrained joint view triangulation for image interpolation. In CVPR, pp. 218-224, 2000.
G. Schindler and F. Dellaert. Atlanta world: An expectation maximization framework for simultaneous low-level edge grouping and camera calibration in complex man-made environments. In CVPR (1), pp. 203-209, 2004.
K. Schindler, J. Bauer, and H. Bischof. Mdl selection for piecewise planar reconstruction. In Proc. of 26th Workshop AAPR, pp. pp. 13-20, 2002.
C. Schmid and A. Zisserman. Automatic line matching across views. In CVPR, pp. 666-671, 1997.
S. Seitz, B. Curless, J. Diebel, D. Scharstein, and R. Szeliski. A comparison and evaluation of multi-view stereo reconstruction algorithms. In CVPR, vol. 1, pp. 519-526, New York, NY, Jun. 2006.
N. Snavely, S. M. Seitz, and R. Szeliski. Photo tourism: exploring photo collections in 3d. ACM Trans. on Graphics (SIGGRAPH), 25(3):835-846, 2006.
R. Szeliski and P. Golland. Stereo matching with transparency and matting. IJCV, 32(1):45-61, Aug. 1999. 2.
L. Zebedin, J. Bauer, K. Karner, and H. Bischof. Fusion of feature- and area-based information for urban buildings modeling from aerial imagery. In ECCV, pp. 873-886, 2008.
O. Barinova, A. Yakubenko, V. Konushin, K. Lee, H. Lim, and A. Konushin. Fast automatic single-view 3-d reconstruction of urban scenes. In ECCV, pp. 100-113, 2008.
Y. Boykov and V. Kolmogorov. An experimental comparison of min-cut/max-flow algorithms for energy minimization in vision. PAMI, 26:1124-1137, 2004.
C. J. Taylor. Surface reconstruction from feature based stereo. CVPR, 1:184, 2003.
D. Comaniciu and P. Meer. Mean shift: A robust approach toward feature space analysis. PAMI, 24(5):603-619, 2002.
S. Coorg and S. Teller. Extracting textured vertical facades from controlled close-range imagery. In CVPR, pp. 625-632, 1999.
N. Cornelis, B. Leibe, K. Cornelis, and L. V. Gool. 3d urban scene modeling integrating recognition and reconstruction. IJCV, 78(2-3):121-141, 2008.
J. M. Coughlan and A. L. Yuille. Manhattan world: Compass direction from a single image by bayesian inference. In ICCV, pp. 941-947, 1999.
M. Kazhdan, M. Bolitho, and H. Hoppe. Poisson surface reconstruction. In Symp. Geom. Proc., 2006.
V. Kolmogorov and R. Zabih. What energy functions can be minimized via graph cuts? PAMI, 26(2):147-159, 2004.
K. Kutulakos and S. Seitz. A theory of shape by space carving.IJCV, 38(3):199-218, 2000.
M. Pollefeys et al. Detailed real-time urban 3d reconstructionfrom video. IJCV, 78(2-3):143-167, 2008.
D. Scharstein and R. Szeliski. A taxonomy and evaluation ofdense two-frame stereo correspondence algorithms. IJCV,47(1-3):7-42, 2002.
S. Seitz and C. Dyer. Photorealistic scene reconstruction byvoxel coloring. In CVPR, pp. 1067-1073, 1997.
H. Tao, H. Sawhney, and R. Kumar. A global matching framework for stereo computation. In ICCV, pp. 532-539, 2001.
J. Y. A. Wang and E. H. Adelson. Representing moving images with layers. IEEE Transactions on Image Processing, 3(5):625-638, 1994.
T. Werner and A. Zisserman. New techniques for automated architectural reconstruction from photographs. In ECCV, pp. 541-555, 2002.

(56) References Cited

OTHER PUBLICATIONS

Yasutaka Furukawa, et al. Manhattan-world Stereo. http://research.microsoft.com/pubs/80495/Furukawa-CVPR09.pdf. Microsoft Corporation. Jun. 1, 2009.

PCT/US/2010/038594 Search Report. 9 Pages.

L. Quan, J. Wang, P. Tan, and L. Yuan, "Image-Based Modeling by Joint Segmentation" The Department of Computer Science and Engineering, The Hong Kong University of Science and Technology, International Journal of Computer Vision 75(I), 135-150, 2007, Accepted Feb. 14, 2007, First online version published in Mar. 2007, 16 pages.

Photosynth, http://photosynth.net/Default.aspx, Microsoft Corporation, Apr. 7, 2009, 1 page.

C. L. Zitnick, S. B. Kang, M. Uyttendaele, S. Winder, and R. Szeliski, "High-quality video view interpolation using a layered representation," Interactive Visual Media Group, Microsoft Research, Redmond, WA, permissions@acm.org 2004, 9 pages.

Y. Furukawa, "Patch-Based Multi-View Stereo Software" furukawa-at-cs.washington.edu, last update Aug. 25, 2008, http://www.cs.washington.edu/homes/furukawa/research/pmvs/home.html Jun. 16, 2009, 2 pages.

N. Snavely, Bundler: Structure from Motion for Unordered Image Collections, Latest version: 0.3, Release Date: May 4, 2009, 3 pages.

S. Sugimoto and M. Okutomi, Department of Mechanical and Control Engineering, Graduate School of Science and Engineering, Tokyo Institute of Technology, A Direct and Efficient Method for Piecewise-Planar Surface Reconstruction from Stereo Images, Authorized licensed use limited to: IEEE Xplore, downloaded on Apr. 7, 2009 at 01:17 from IEEE Xplore, 8 pages.

N, Chehata, F. Jung and G. Stamon, "A graph cut optimization guided by 3D-features for surface height recovery," ISPRS Journal of Photogrammetry and Remote Sensing 64 (2009) 193-203, www.elsevier.com/locate/isprsjprs, Published by Elsevier B.V. 2008, 11 pages.

V. Andersen, vedrana@itu.dk Smoothing 3D Meshes using Markov Random Fields, Master's thesis, Supervisors: Mads Nielsen, Professor, DIKU and Henrik Aanaes, Associate Professor, DTU, ITU, Sep. 2006-Apr. 2007, 105 pages.

CN Office Action, mailed Jul. 24, 2013, in CN Application No. 201080026636.

Steven M. Seitz, et al "A Comparison and Evaluation of Mulit-view Stereo Reconstruction Algorithms", IEEE (2006).

Yuri Boykov, et al. "Fast Approximate Energy Minimization via Graph Cuts", IEEE Transactions on Pattern Analysis and Machine Intelligence, vol. 23, No. 11 (Nov. 2001).

Uppalapati, et al., "3D VQI: 3D Visual Query Interface", Retrieved May 7, 2012 at <<http://i3dea.asu.edu/data/docs_pubs/3D_VQI_II_Report.pdf>>, Proceedings of Sixth International Conference on Information Technology: New Generations, ITNG 2009, Las Vegas, Nevada, Apr. 27, 2009, 9 pages.

Min, Patrick, "A 3D Model Search Engine", Retrieved May 8, 2012 at <<http://www.cs.princeton.edu/~min/publications/min04.pdf>>, Dissertation, Princeton University, Jan. 2004, 139 pages.

Min, et al., "Early Experiences with a 3D Model Search Engine", Retrieved May 7, 2012 at <<http://www.cs.jhu.edu/~misha/MyPapers/WEB3D.pdf>>, Proceedings of the Eighth International Conference on 3D Web Technology (Web3D '03), Symp., Saint Malo, France, 2003, 12 pages.

Yang, et al., "Content-Based 3-D Model Retrieval: A Survey", Retrieved May 7, 2012 at <<http://ieeexplore.ieee.org/stamp/stamp.jsp?tp=&arnumber=4344001>>, IEEE Transactions on Systems, Man, and Cybernetics—Part C: Applications and Reviews, vol. 37, No. 6, Nov. 2007, pp. 1081-1098.

Kopf, et al., "Navigation Model to Render Centered Objects Using Images," U.S. Appl. No. 13/156,975, filed Jul. 9, 2011, 32 pages.

What is Photosynth?, Retrieved Jul. 10, 2012 at <<http://photosynth.net/about.aspx/>>, 2 pages.

Australian Office Action dated Mar. 27, 2014 re Application No. 2010260256, 2 pages.

Chinese Office Action dated Jan. 21, 2014 re Application No. 201080026636.3, 3 pages.

Chinese Notice of Allowance dated May 8, 2014 re Application No. 201080026636.3, 1 page.

Restriction Requirement dated Apr. 17, 2014 re U.S. Appl. No. 13/567,105, 8 pages.

International Search Report dated Oct. 10, 2013 regarding PCT Patent Appln. No. PCT/US2013/053323 4 pages Nieuwenhuisen, et al., "Motion planning for camera movements", Retrieved at <<http://ieeexplore.ieee.org/stamp/stamp.jsp?tp=&arnumber=1308871>>, Proceedings of IEEE International Conference on Robotics & Automation, Apr. 26-May 1, 2004, pp. 3870-3876.

Smith, et al., "Light field video stabilization", <<http://ieeexplore.ieee.org/stamp/stamp.jsp?p=&arnumber=5459270>>, Proceedings of 12th IEEE International Conference on Computer Vision, Sep. 29-Oct. 2, 2009, pp. 341-348.

Marchand, et al., "Image-based virtual camera motion strategies", <<http://www.irisa.fr/lagadic/pdf/2000_gi_marchand.pdf>>, Proceedings of Graphics Interface Conference, May 2000, 8 pages.

Goemans, et al., "Automatic Generation of Camera Motion to Track a Moving Guide", <<http://citeseerx.ist.psu.edu/viewdoc/download?doi=10.1.1.2.1792&rep=rep1&type=pdf>>, Proceedings of International Workshop on the Algorithmic Foundations of Robotics, Jul. 20, 2004, pp. 1-17.

Santos, et al., "Camera control based on rigid body dynamics for virtual environments", <<http://ieeexplore.ieee.org/stamp/stamp.jsp?tp=&arnumber=5068922>>, International Conference on Virtual Environments, Human-Computer Interfaces and Measurements Systems, May 11-13, 2009, 6 pages.

Office Action dated Jul. 16, 2013 regarding U.S. Appl. No. 13/156,975 15 pages.

Response filed Oct. 7, 2013, in response to Office Action mailed Jul. 16, 2013 regarding U.S. Appl. No. 13/156,975 9 pages.

Notice of Allowance dated Oct. 25, 2013 regarding U.S. Appl. No. 13/156,975 10 pages.

\* cited by examiner

PIECEWISE PLANAR RECONSTRUCTION OF THREE-DIMENSIONAL SCENES

BACKGROUND

Conventionally, a computer's rendering engines may be configured to provide automatic feature matching or feature extraction that recovers camera calibrations and a sparse structure of a scene from an unordered collection of two-dimensional images. The conventional rendering engine may use the camera calibrations, sparse scene structure, and the two-dimensional images to triangulate the location of each pixel in a three-dimensional space. The pixels are rendered in the triangulated locations to form a three-dimensional scene.

However, the quality and detail of the generated three-dimensional scenes often suffers from various drawbacks. For instance, the conventional rendering engines may render textureless or non-Lambertian surfaces captured in the two-dimensional images as holes. The holes are covered by interpolating the depth of neighboring pixels. But the conventional rendering engine's interpolation may erroneously reproduce flat surfaces with straight lines as bumpy surfaces in the three-dimensional scene. The conventional rendering engine may also erroneously introduce jaggies in the three-dimensional scene because of unreliable matching of the non-Lambertian surfaces, occlusions, etc.

The quality and detail of the conventional rendering engines significantly degrades when generating three-dimensional scenes of architectural scenes, urban scenes, or scenes with man-made objects having plentiful planar surfaces. Moreover, the reconstruction of the three-dimensional scene from a sparse collection of two-dimensional images is not navigable in a photorealistic manner because the assumptions of the conventional computer vision algorithms executed by the conventional rendering engines are not designed to work well for scenes containing man made surfaces.

SUMMARY

Embodiments of the invention overcoming these and other problems in the art relate in one regard to a computerized reconstruction system, computer-readable media, and computer-implemented method to generate navigable, photo-realistic scenes from a collection of two-dimensional images. The computerized reconstruction system recovers a dense, piecewise planar reconstruction of a scene captured from the collection of two-dimensional images.

The computerized reconstruction system identifies a discrete set of three-dimensional plane candidates. The computerized reconstruction system generates the discrete set of three-dimensional plane candidates based on a sparse point cloud of the scene and sparse three-dimensional line segments reconstructed from multiple views captured in the collection of two-dimensional images. In turn, a piecewise planar depth map is recovered for each image by solving a multi-label Markov Random Field (MRF) optimization problem using graph-cut based energy minimization techniques. The computerized reconstruction system projects the original two-dimensional images onto the recovered planar depth maps to generate a rendering of the three dimensional scene.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

FIG. 2 is an image diagram that illustrates exemplary two-dimensional images in accordance with embodiments of the invention.

FIG. 3 is a plane diagram that illustrates exemplary three-dimensional planes in accordance with embodiments of the invention.

FIG. 4 is a three-dimensional scene diagram that illustrates an exemplary scene generated by the computing system in accordance with embodiments of the invention.

FIG. 5 is a vanishing direction diagram that illustrates detection of vanishing direction within two-dimensional images in accordance with embodiments of the invention.

FIG. 6 is a normal orientation diagram that illustrates probable distribution of surface normals in accordance with embodiments of the invention.

FIG. 7 is a distribution histogram that illustrates probable distribution of the orientation of the planes or three-dimensional lines in accordance with embodiments of the invention.

FIG. 10 is a photo-consistency diagram that illustrates the relationship between two-dimensional images used to generate the three-dimensional scenes in accordance with embodiments of the invention.

FIG. 11 is a boundary diagram that illustrates crease edges corresponding to the intersection of a pair of planes and occlusion boundaries for planes in the three-dimensional scene in accordance with embodiments of the invention.

DETAILED DESCRIPTION

Figure 1:
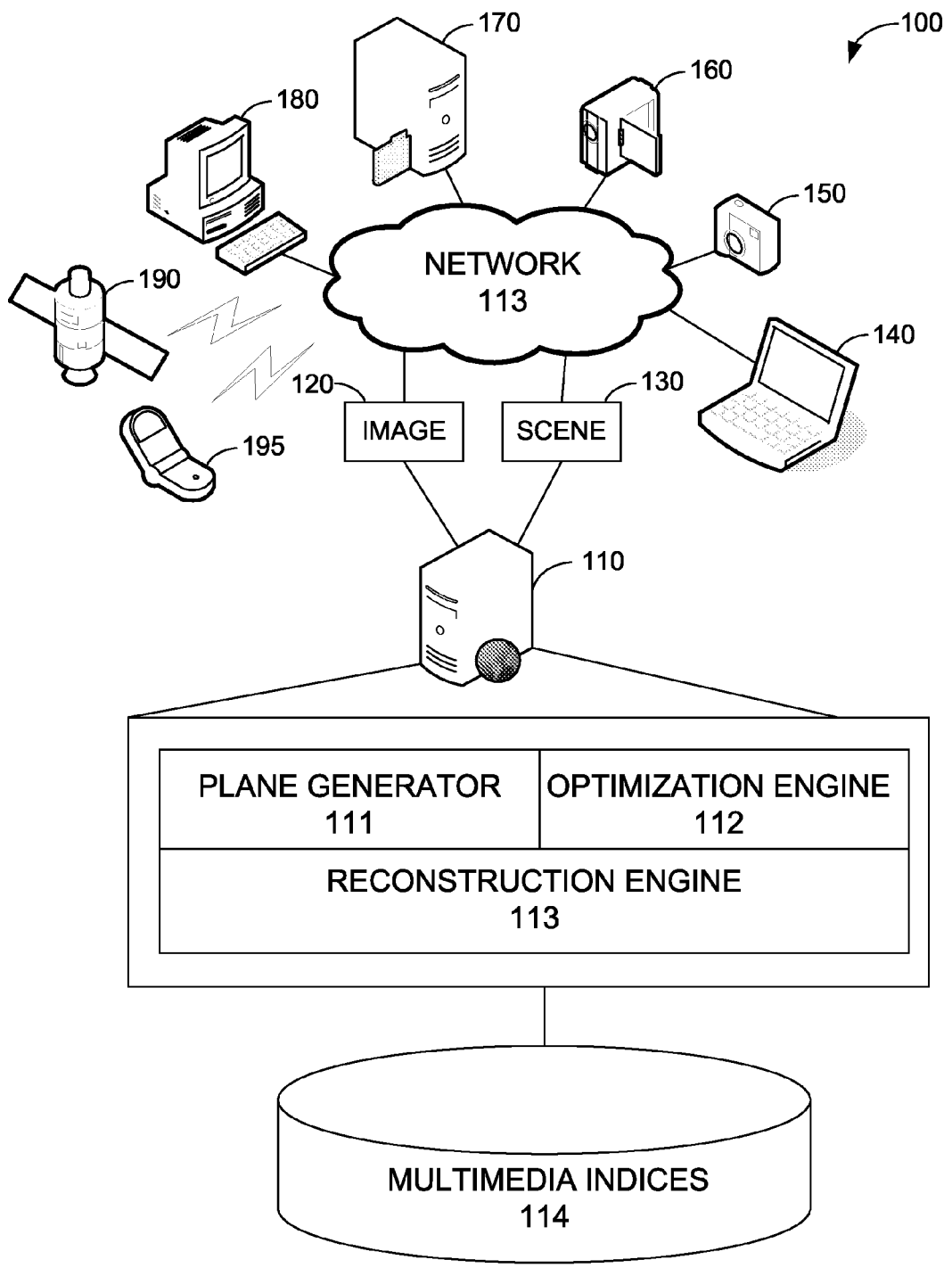
FIG. 1 is a network diagram that illustrates an exemplary computing system in accordance with embodiments of the invention.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

Embodiments of the invention provide a computerized reconstruction system that generates navigable three-dimensional scenes from a collection of two-dimensional images. The two-dimensional images are processed by the computerized reconstruction system to extract matching features, camera calibrations, and geographic or spatial information. In turn, the computerized reconstruction system automatically detects vanishing directions from the two-dimensional images. The matching features, camera calibrations, spatial information, and vanishing directions are used by the computerized reconstruction system to generate a set of plane candidates for the three-dimensional scene. The probable orientation for the set of plane candidates is determined and a Markov Random Field is generated by the computerized reconstruction system. In turn, a minimization function corresponding to the Markov Random Field is used by the computerized reconstruction system to generate the three-dimensional scene from the two-dimensional images by assigning pixels from the two-dimensional images to the set of candidate planes.

As one skilled in the art will appreciate, the computerized reconstruction system may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory technologies can store data momentarily, temporarily, or permanently.

FIG. 1 is a network diagram that illustrates an exemplary operating environment 100, according to an embodiment of the present invention. The operating environment 100 shown in FIG. 1 is merely exemplary and is not intended to suggest any limitation as to scope or functionality. Embodiments of the invention are operable with numerous other configurations. With reference to FIG. 1, the operating environment 100 includes a computerized reconstruction server 110, two-dimensional images 120, three-dimensional scenes 130, a laptop 140, multimedia capture devices 150 and 160, a file server 170, a personal computer 180, a satellite 190, and a mobile device 195 in communication with one another through a network 113.

The computerized reconstruction server 110 is configured to generate a navigable three-dimensional scene 130. The computerized reconstruction server 110 includes a plane generator 111, an optimization engine 112, a reconstruction engine 113, and multimedia indices 114. The computerized reconstruction system may receive a request to generate a three-dimensional scene 130 from a computing device (e.g., laptop 140, multimedia capture devices 150 and 160, file server 170, personal computer 180, satellite 190, and mobile device 195). The requests may include a collection of two-dimensional images 120 that is transmitted to the computerized reconstruction server 110. The computerized reconstruction server stores the collection of two-dimensional images 120 in the multimedia indices 114.

The plane generator 111 is configured to identify candidate planes from camera and scene information included in the two-dimensional images 120. In turn, the plane generator 111 determines the probable orientation for each candidate plane, and clusters the candidate planes sharing similar probable orientations. In some embodiments, the plane generator 111 creates a ground plane and back plane to represent the boundaries of the three-dimensional scene 130.

The plane generator 111 extracts global scene information from the two dimensional images 120. The global scene information, may includes three dimensional points and coordinates, vanishing directions, three-dimensional line segments, and measure of the correspondence of three-dimensional points, three-dimensional lines, and vanishing directions from multiple views of a scene captured in the two-dimensional images 120. In one embodiment, the plane generator 111 executes a modified Random Sample Consensus (RANSAC) algorithm to detect the candidate planes using the global scene information.

The plane generator 111 may extract the three-dimensional points and coordinates from the two-dimensional images 120 and any associated metadata provided by the camera that captured the scene. The metadata provided by the camera may include location information, distance information, and any other camera calibration information. Thus, the plane generator 111 may use the metadata and two-dimensional images 120 to generate a spatial three-dimensional point for the each pixel in the two-dimensional image. In some embodiments, the plane generator 111 groups pixels into super-pixels based on similarity.

The vanishing directions in the scene captured by the two-dimensional images 120 are detected by the plane generator 111. In one embodiment, an edge detection algorithm is executed by the plane generator 111 to detect the vanishing directions in the two-dimensional images 120. The edge detection algorithm provides two-dimensional line segments included in the two-dimensional image 120. The two-dimensional line segments are connected to form an edge map for each image in the collection of two-dimensional images. And the lines or line segments in each edge map that correspond to parallel lines in three dimensions are detected by the plane generator 111. Vanishing points in the images correspond to vanishing directions in the three-dimensional scene. The plane generator 111 performs a mean-shift clustering on the unit sphere of vectors corresponding to the vanishing directions. The clusters that have a large number of vanishing directions are retained by the plane generator 111 and the sparse clusters are discarded. The plane generator 111 identifies a representative vanishing direction for each cluster using each two-dimensional line segment from the different views of the scene included in the cluster. In some embodiments, the plane generator 111 inspects the set of vanishing directions for pairs that are almost orthogonal to each other and adds a third vanishing direction that completes an orthogonal triplet unless the orthogonal triplet is already present in the set.

The three-dimensional line segments are constructed by the plane generator 111, which uses epipolar constraints and the global scene information to identify matching line segments. The plane generator 111 searches for pairs of two-dimensional line segments having similar vanishing directions and with proximal matching points of interest in the scene captured by the two-dimensional image. The multiple matching pairs of two-dimensional lines are linked together and the plane generator 111 verifies the consensus for the three-dimensional line from a number of views of the scene captured by the two-dimensional image. In some embodiments, the number of views used for verification is at least four. The three-dimensional lines are computed by triangulating the two-dimensional segment pairs and finding the pair that has the overall minimum reprojection error within the linked two-dimensional segments. In turn, the plane generator 111 determines the endpoints of the three-dimensional line segment via interval analysis. In some embodiments, the plane generator 111 looks for two-dimensional segments that are not constrained by the identified vanishing directions. These additional two-dimensional segments (outliers) are clustered based on their direction and covariance.

The plane generator 111 determines the orientation of the planes and probable location of each three-dimensional point based on the generated three-dimensional lines and the identified vanishing directions. A set of likely plane orientations $\{\hat{n}_i\}$ is generated by the plane generator 111 by evaluating the cross-product of every pair of vanishing direction. In certain embodiments, plane orientations $\hat{n}_i$ within five degrees of each other are treated as duplicates. The plane generator 111 sorts the set of likely plane orientations $\{\hat{n}_i\}$ based on saliency. The saliency of each plane orientation $\hat{n}_i$ is measured by counting size of the clusters associated with the corresponding pair of vanishing directions.

The probable location of each three-dimensional point is determined by the plane generator 111. In one embodiment, a three-dimensional Mahalonobis distance is computed by the plane generator 111 for each three-dimensional point to determine whether the three-dimensional point belongs to one or more plane hypothesizes represented by the three-dimensional lines and vanishing directions. The Mahalonobis distance measures the covariance (uncertainty) of the three-dimensional point and corresponding fitting error of the plane hypothesis. In certain embodiments, the plane generator 111 identifies an approximate uncertainty for each three-dimensional point $X_k$ by computing a vector $\vec{w}_k$ oriented along the mean viewing direction of the scene captured by the two-dimensional images 120. The magnitude of the vector $\vec{w}_k$ corresponds to the projected uncertainty of a pixel in the two-dimensional images 120. The magnitude of the vector $\vec{w}_k$ may be used by the plane generator 111 to evaluate the uncertainty of the plane hypothesizes.

The surface normal for each three-dimensional point $X_k$ is determined by the plane generator 111 based on a discrete likelihood distribution over the set of plane orientations $\{\hat{n}_i\}$. Each oriented plane passing through the three dimensional point $X_k$ is given a score by the plane generator 111 based on the number of neighboring three-dimensional points around the three-dimensional point $X_k$ and the robust variance along one dimension of the oriented plane. The plane generator 111 assigns a surface normal to each three-dimensional point having a dense neighborhood with unique peaks along one dimension of the oriented plane likelihood distribution. The surface normal assigned to the three-dimensional point restricts the assignment of the corresponding three-dimensional point to three-dimensional planes. In some embodiment, the plane generator 111 uses line direction of a three-dimensional line to decide which planes the three-dimensional line may vote for during assignment of planes and three-dimensional lines. Similarly, the surface normal of a three-dimensional point may be used by the plane generator 111 to decide which planes the three-dimensional point may vote for during assignment of three-dimensional points to planes.

Each three-dimensional point and three-dimensional line are used by the plane generator 111 to determine the planes of a scene captured by the two-dimensional image 120. The plane generator 111 builds two histograms ($H_i^1$ $H_i^2$) to measure the votes for each orientation $\hat{n}_i$ received from the three-dimensional points and three-dimensional lines. The plane generator 111 counts a vote from each three-dimensional point and three-dimensional line when a location associated with the cameras that captured the corresponding two-dimensional image 120 is positioned in front of the plane. The plane generator 111 does not count a vote for each three-dimensional point and three-dimensional line having estimated normals that fail to match the orientation $\hat{n}_i$ of the plane. In some embodiments, the plane generator 111 filters each three-dimensional point and three-dimensional line having estimated normals that fail to match the orientation $\hat{n}_i$ of the plane.

In one embodiment, three-dimensional points and three-dimensional lines are sampled by the plane generator 111 to obtain a representative collection of three-dimensional points and three-dimensional lines that are used to create the histograms ($H_i^1$ $H_i^2$). The set of samples ($S^1$) for the three-dimensional points are constructed by the following $S^1=\{x_k: x_k=\hat{n}\cdot X_k\}$. The set of samples ($S^2$) for the three-dimensional lines are constructed by the following $S^2=\{y_k: y_k=\hat{n}\cdot Y_k\}$, where $Y_k$ represents the three-dimensional lines.

Each three-dimensional point sample $x_k$ is represented by an adaptive Gaussian kernel of size ($W\vec{w}_k\cdot\hat{n}_i$). The size of the kernel is adapted by the plane generator 111 to account for the uncertainty associated with each three-dimensional point. The plane generator 111 assigns a weight (W) to control the smoothness of histogram $H_i^2$. In turn, the plane generator 111 creates a one-dimensional subspace orthogonal to $\hat{n}_i$ and projects each three-dimensional point sample $x_k$ in the one-dimensional subspace to determine if the three-dimensional point samples share the orientation $\hat{n}_i$. For each match, the count in the histogram $H_i^2$ for the current orientation $\hat{n}_i$ increases.

Each three-dimensional line sample $y_k$ is represented by an adaptive Gaussian kernel of size ($|y_k|W\vec{w}_k\cdot\hat{n}_i$). The size of the kernel is adapted to account for the uncertainty associated with each three-dimensional line. W is weight assigned to controls the smoothness of histogram $H_i^2$. In turn, the plane generator 111 creates a one-dimensional subspace orthogonal to $\hat{n}_i$ and projects each three-dimensional line sample $y_k$ in the one-dimensional subspace to determine if the three-dimensional line sample shares the orientation $\hat{n}_i$. For each match, the count in the histogram $H_i^2$ for the current orientation $\hat{n}_i$ increases.

The plane generator 111 detects local peaks in both histogram ($H_i^1$ $H_i^2$). In certain embodiments, the plane generator counts peaks in $H_i^2$ when a three-dimensional line has multiple ($\geq 2$) unique directions all orthogonal to $\hat{n}_i$ because multiple parallel three-dimensional lines are often accidentally co-planar and non parallel lines are less likely to be coplanar unless a real plane exists in the scene. Also, the plane generator 111 performs non-maximal suppression to avoid generating candidate planes that are too close. In turn, the candidate planes are generated based on any combination of peak orientations, three-dimensional points, and three-dimensional lines.

In other embodiments, the plane generator 111 provides additional planes for outlier portions of a scene captured by the two-dimensional images 120, ground planes, and back planes. Outlier portions are regions of the two-dimensional image 120 having sparse global scene information. The plane generator 111 may execute a random sampling of three-dimensional points and vanishing directions using a two-point or three-point RANSAC algorithm. In turn, the uncertainty of the associated three-dimensional points is calculated by the plane generator 111 and the orientation of the additional planes passing through the three-dimensional points is determined to identify a set of candidate planes.

The plane generator 111 also computes a ground plane and back-plane for each view of the two-dimensional image captured by the camera. The ground plane is estimated by selecting the up vector orthogonal to the side vector of the camera. The ground plane is identified as a plane orthogonal to the up vector and having 95% of the three-dimensional points positioned above the plane. In turn, the plane generator 111 refines the ground plane to better represent the ground in the three-dimensional scene.

The back plane is estimated by selecting the vector orthogonal to the optical axis of the camera. The back plane is identified as a plane orthogonal to the optical axis and having 95% of the three-dimensional points positioned in front of the plane. In turn, the plane generator 111 may optimize the back plane to better represent the back ground in three-dimensional scene.

The optimization engine 112 is configured to generate a depth map for each two-dimensional image using the candidate planes provided by the plane generator 111. The optimization engine 112 generates a Markov Random Field (MRF) using the candidate planes and the pixels in the two-dimensional image. The optimization engine 112 generates a graph having nodes that represent pixels and planes. The graph also included edges that connect the nodes of the graph. Each edge is associated with a cost that represents the penalty for assigning different plane labels to the two pixels that the edge connects. The optimization engine 112 evaluates an objective function that measures the consistency of plane label assignment to pixels in the image. In some embodiments, the optimization engine 112 uses an energy function E to determine the optimal labeling of the pixels.

The energy function E represents a log likelihood of a posterior probability distribution in a MRF defined on the underlying pixel data with a neighborhood system (e.g. A 4-connected neighborhood considers all vertical and horizontal neighbor pixels). The optimization engine 112 may evaluate $$E(l) = \sum_p D_p(l_p) + \sum_{p,q} V_{p,q}(l_p, l_q).$$

Each plane P corresponds to a label l. Each pixel corresponds to a point p in the image and may be assigned a label $l_p$. The set of labels is finite and is chose from a closed set $l_p \in L$. The energy function E includes a data term and a smoothness term. The data term $D_p$ allows the optimization engine 112 to measure the cost (penalty) of pixel p being assigned the label $l_p$. The smoothness term $V_{p,q}$ allows the optimization engine 112 to encourage a piecewise smooth labeling (i.e. regularizes the solution) by assigning a cost whenever neighboring pixels p and q are assigned labels $l_p$ and $l_q$, respectively. In certain embodiments, $V_{p,q}$ is a metric and the optimization engine 112 may execute an expansion move algorithm to compute a label assignment that is within a provable distance from a global optimum.

In some embodiments, the optimization engine 112 may select labels $l_p$ for a subset of planes $M \subseteq P$. The subset of planes is denoted by $M=\{m_i\}$, i=1 ... N and each selected plane $m_i$ faces the camera and lies within the view frustum of the camera. The optimization engine 112 may sort the planes $m_i$ based on density of pixels associated with a location that corresponds to the location of the plane $m_i$. Additionally, the optimization engine may include the ground plane and back plane in the subset of planes M based on the location of the horizon in the collection of two-dimensional images.

In one embodiment, the optimization engine 112 measures $D_p$ by combining multi-view photo consistency, geometric proximity of three-dimensional points and lines, and ray visibility of the three-dimensional points and planes. $D_p$ measures the cost of assigning label $l_p$ (i.e. plane $m_p$) to pixel p. $D_p = D_p^1(l_p) + D_p^2(l_p) + D_p^3(l_p)$, where $D_p^1$ is the multi-view photo-consistency, $D_p^2$ is the geometric proximity of sparse three-dimensional points and lines, and $D_p^3$ measures free space violations based ray visibility of three-dimensional points and planes. In an embodiment, the optimization engine 112 may densely measure $D_p^1$ at each pixel, and employ sparse constraints to measure $D_p^2$ and $D_p^3$ at specific pixels in one or more two-dimensional images 120.

The optimization engine 112 measures the multi-view photo-consistency $D_p^1$ by selecting a number of views from neighboring images of a reference image and measures the similarity between the views of the neighboring images and the reference image. In one embodiment, the optimization engine 112 selects k(≤10) neighboring images $I_j'$ for a reference image $I_r$. In turn, the optimization engine 112 generates homographies by the plane $m_p$ to warp each neighboring image $I_j'$ into the reference image $I_r$. The warped image $I_j''$ and the reference image $I_r$ are used by the optimization engine 112 to measure a Normalized Cross Correlation (NCC) at each pixel p in a ρ×ρ path of the warped image $I_j''$ and the reference image $I_r$. In some embodiments, ρ=9 and the NCC measure the similarity of pixels of the reference image $w_r(p)$ and pixels of the warped image $w_j(p)$. The optimization engine 112 may account for the uncertainty in the location of the candidate planes with a disparity range d. The disparity range $\delta_p$ may be centered around plane $m_p$ and the optimization engine 112 may search for a best match within the disparity range. In some embodiments, the optimization engine rectifies the two-dimensional images ($I_r$, $I_j''$) when seeking for the best match. The measure of NCC associated with each plane is $M_j(p) = \max(NCC(w_r(p), w_j(q)))$, where q=(p−d, p+d). The similarity measure for each neighbor image is averaged in the overall measure of similarity that is used to evaluate $D_p^1$.

$$D_p^1(l_p) = \frac{K}{2}\left(1 - \exp\left(-\frac{(1-\overline{M}(p))^2}{\sigma^2}\right)\right)$$

where σ=0.8 and K=300. In an embodiment, the optimization engine 112 may treat occlusions in the images as outliers when evaluating the similarity scores.

The optimization engine 112 measures the geometric proximity of sparse three-dimensional points and lines $D_p^2$. The optimization engine 112 selects each three-dimensional point identified as an inlier of plane $m_p$. In turn, the closest three-dimensional point on the plane $m_p$ is selected by the optimization engine 112. The three-dimensional points that are the inlier of the plane $m_p$ and on the plane $m_p$ are projected on a reference three-dimensional view at pixels q and, respectively. The optimization engine 112 evaluates $D_p^2(l_p) = \max(100, d(q,q')^2)$ for all pixels p within a three by three window around q to determine the geometric proximity of the three-dimensional point. The optimization engine 112 measures the geometric proximity of sparse three-dimensional lines $D_p^2$ using the endpoints of the three-dimensional line and evaluating the reprojection error of each endpoint.

The optimization engine 112 measures the free space violations based on ray visibility of three-dimensional points and planes and $D_p^3$. The optimization engine 112 assigns a large penalty to pixel-plane assignments that violate a free-space constraint. A three-dimensional point X or line segment L matched to a view captured by one or more two dimensional images should be visible in the corresponding views in the three-dimensional scene. The optimization engine 112 identifies the three-dimensional point X or line segment L that should be visible and identifies rays that correspond to the three-dimensional point X or line segment L. The optimization engine 112 locates any planes that intersect the three-dimensional point X or line segment L and applies a free-space violation penalty. In one embodiment, the set of three-dimensional points F on each plane $m_p$ that represents the location where a ray plane intersection occurs is identified by the optimization engine 112. In turn, $D_p^3(l_p)=K$ is assigned by the optimization engine 112 for each $X_j \in F$ that projects into a view of the three-dimensional scene for all pixels p in a three by three window around pixel q associated with the three-dimensional point. $X_j$.

The smoothness terms $V_{p,q}$ are assigned by the optimization engine 112 to efficiently assign pixels and labels at boundaries in the three-dimensional scene. The optimization engine 112 encourages piecewise constant labeling with suitable discontinuities. The smoothness terms impose geometric constraints derived from plane arrangements and vanishing directions that enable the optimization engine 112 to recover accurate label boundaries. In some embodiments, the optimization engine 112 is configured to identify occlusion edges and crease edges in the two-dimensional images that are part of the three-dimensional scene. The depth maps associated with the three-dimensional scene may include both occlusion edges and crease edges, which may represent the planar discontinuities. At the occlusion edges both plane labels and scene depths differ at pixels moving across the occlusion edge. Occlusion edges may occur anywhere in the two-dimensional images. But for planar scenes the occlusion edges typically coincide with visible two dimensional line segments in the two-dimensional images. At the creases edges only the plane labels differs for pixels across the crease edge. The crease edge between a pair of plane labels coincides with the projection of a three-dimensional intersection line of the two corresponding planes and is therefore always a straight line segment.

In another embodiment, the optimization engine 112 may simultaneously estimate the planar geometry for each two-dimensional image in the collection of two-dimensional images. The estimated planar geometry of the three-dimensional scene may have inconsistencies. The optimization engine 112 detects the inconsistencies by rendering a ray through a pixel in each two-dimensional image to a candidate plane corresponding to that pixel to locate a three-dimensional point. The optimization engine 112 may reproject the three-dimensional point onto a pixel in a neighboring image to determine if the plane assigned to the pixel in the neighboring image corresponding to the three-dimensional point matches the candidate plane in the original two-dimensional image. The optimization engine 112 may deal with inconsistencies by adding smoothness terms that penalize inconsistent pixel-plane assignments. For each possible plane choice at a pixel, a smoothness term that connects the plane to the corresponding pixel in a neighboring image is determined. If the pixel-plane assignment in the corresponding neighboring pixel disagrees, then a penalty is added as a smoothness term to the global cost calculated by an optimization function employed by the optimization engine 112.

In one embodiment, the optimization engine 112 detects the occlusion edges and crease edges by identifying line segments in the two-dimensional images. The label boundaries that pass through two-dimensional line segments are used to locate the occlusion and crease edges. In some embodiments, vanishing directions are used by the optimization engine to signal a preference for straight line occlusion edges.

The optimization engine 112 evaluates a piecewise definition for the smoothness terms in the three-dimensional scene. The neighboring planes $l_p$ and $l_q$ associated with neighboring pixels (p, q) are used to evaluate the smoothness terms.

$$l_p = l_q \text{ then } V_{p,q}(l_p, l_q) = 0.$$

$$l_p \ne l_q \text{ then } V_{p,q}(l_p, l_q) = \begin{cases} \lambda_1 & \text{if } (p, q, l_p, l_q) \in S_1 \\ \lambda_2 & \text{if } (p, q, l_p, l_q) \in S_2 \text{ or if } (p, q) \in S_3 \\ \lambda_3 & \text{otherwise.} \end{cases}$$

In some embodiments, $\lambda_1=1000$, $\lambda_2=1200$, and $\lambda_3=2000$.

The optimization engine 112 determines a set of crease lines $\{L_{ij}\}$ for all plane pairs $(m_i, m_j)$ in the subset of planes M and selects the planes $l_i$ and $l_j$ that are within the boundaries of the two-dimensional image. For each plane $l_i$ and $l_j$, the optimization engine 112 locates pairs of neighboring pixels (p, q) in the two-dimensional image, where p and q are on different sides of $l_i$ and $l_j$. The optimization engine 112 creates a set $S_1$ with a four-tuple combination of $(p, q, l_i, l_j)$.

The optimization engine 112 determines a set of occlusion lines $\{L_{ik}\}$. Vanishing directions orthogonal to the normal for each plane $m_i$ are used to locate the occlusion lines. The two-dimensional line segments that support the identified vanishing directions are used to locate pairs of neighboring pixels (p, q) in the two-dimensional image, where p and q are on different sides of $l_i$ and $l_k$. The optimization engine 112 creates a set $S_2$ with a four-tuple combination of $(p, q, l_i, l_j)$. The set $S_2$ is populated by the optimization engine 112, which back projects a ray from the midpoint of p and q to obtain a list of planes $\{m_k\}$ that are beyond $\{m_i\}$ when sorted based on distance from the camera.

The remaining two-dimensional line segments are identified by the optimization engine 112. And a set $S_3$ of the neighboring pixels (p,q) that support the two dimensional lines is generated. The smoothness term allows the optimization engine 112 to effectively represent planes with discontinuities included in the three-dimensional scene.

The reconstruction engine 113 is configured to provide navigation within the three-dimensional scene based on the optimizations on the three-dimensional planes and associated pixels provided by the optimization engine. In one embodiment, a graph-cut optimization provides the depth maps and proxy meshes that are used to generate the navigable three-dimensional scene. The reconstruction engine 113 may convert each label image in the collection of two-dimensional images to a two-dimensional triangulation. In some embodiments, the reconstruction engine uses a polyline simplification on the label boundaries to generate the triangulation of the two-dimensional image. In turn, the triangulation of the two-dimensional images is mapped by the reconstruction engine 113 directly to a set of three-dimensional triangles that are formed from the planes corresponding to labels.

In turn, projective texture mapping is applied to the set of three-dimensional triangles by the reconstruction engine 113 to allow view interpolation among multiple two-dimensional images. During view interpolation, the reconstruction engine 113 projectively texture maps each two-dimensional image onto its corresponding proxy meshes.

The texture mapping performed by the reconstruction engine 113 may produce blended and cross-faded planes that represent the three-dimensional scene. The blended colors $(C_1, C_2)$ for each pixel are determined by reconstruction engine, which evaluates the following:

$$C = \frac{(1-\mu)C_1 + \mu C_2}{(1-\mu)\alpha_1 + \mu\alpha_2}, \text{ where } 0 \le \mu \le 1$$

$$\text{and } \alpha_1 \text{ and } \alpha_2 = \begin{cases} 1 & \text{if pixles have valid depth after warping} \\ 0 & \text{otherwise.} \end{cases}$$

The reconstruction engine 113 is configured to provide transitions with pixels in the interpolated views of the three-dimensional scene covered only by one source image to be rendered at full opacity throughout the transitions. The reconstruction engine 113 linearly cross-fades pixels with contributions from multiple images during the view interpolation. The cross-fading preformed by the reconstruction engine 113 prevents the viewer from focusing on disoccluded regions of a two-dimensional image that are filled in by the other two-dimensional image.

A user may provide a collection of two-dimensional images to the computerized reconstruction server that reconstructs a three-dimensional scene. Alternatively, the user may execute a three-dimensional reconstruction program on a local computer to reconstruct a three-dimensional scene from two-dimensional images located on the local computer. The three-dimensional scene is navigable and provides the user with an immersive experience of the scene captured by the two-dimensional images.

Figure 2A:
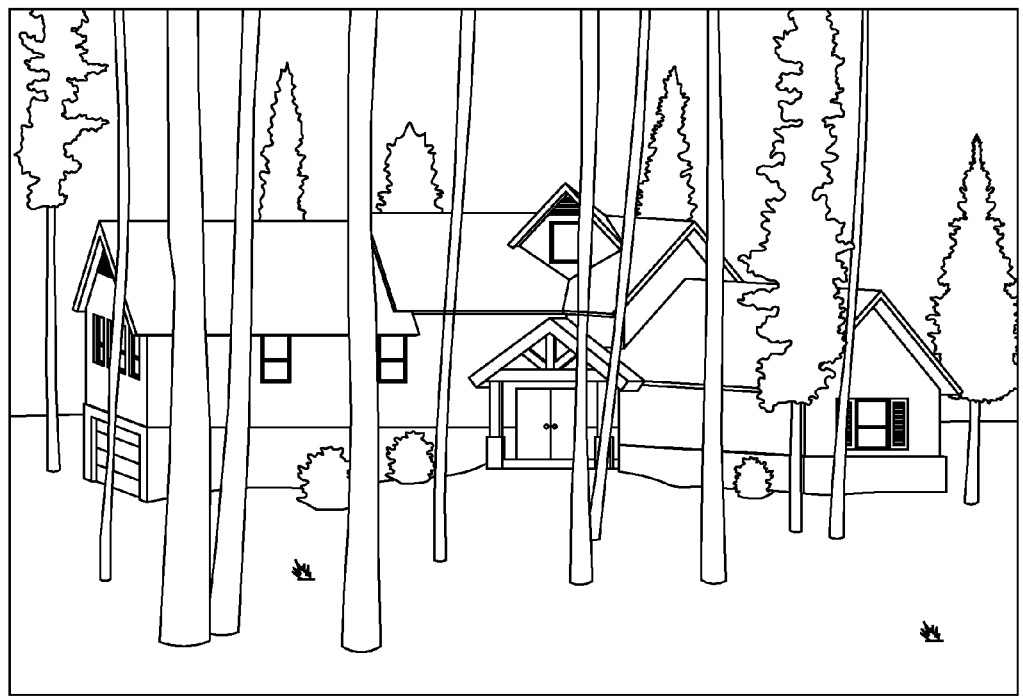
FIG. 2A-B illustrate two-dimensional images captured by a camera, in accordance with embodiments of the invention.
Figure 2B:
Figure 3A:
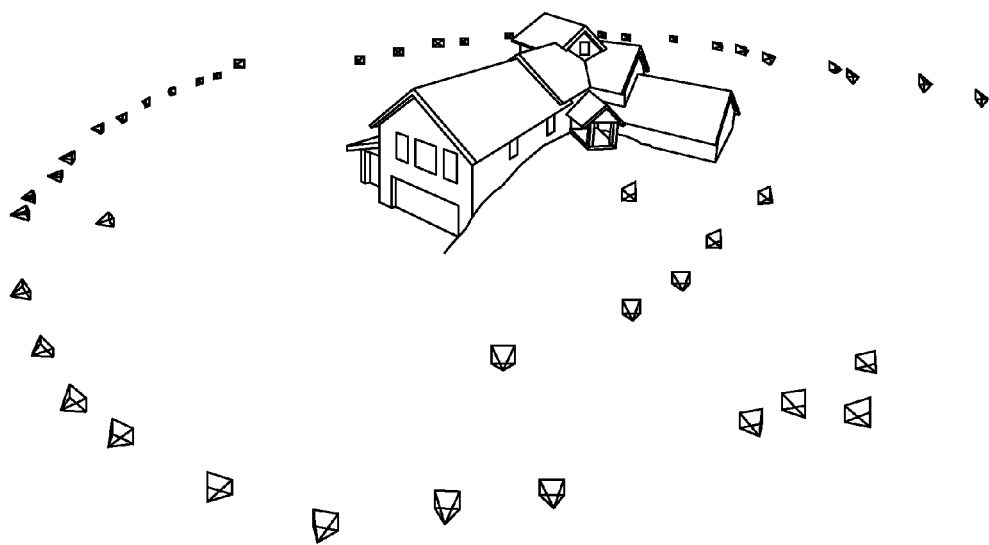
FIG. 3A illustrates the structure from motion feature extraction and camera calibration determinations, in accordance with embodiments of the invention.
Figure 3B:
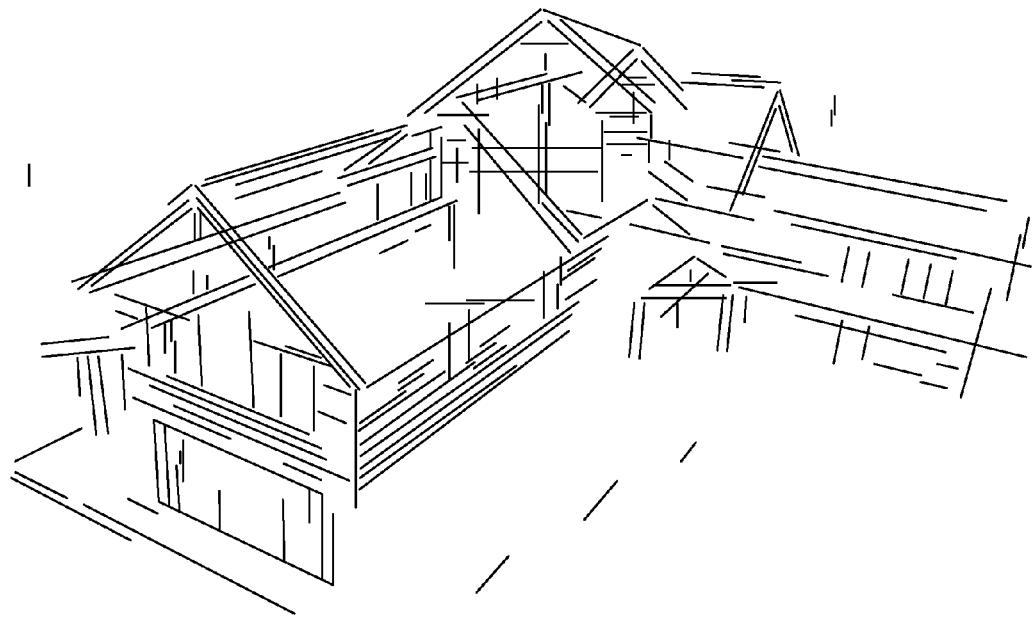
FIG. 3B illustrates the three-dimensional lines generated by a computerized reconstruction server, in accordance with embodiments of the invention.
Figure 3C:
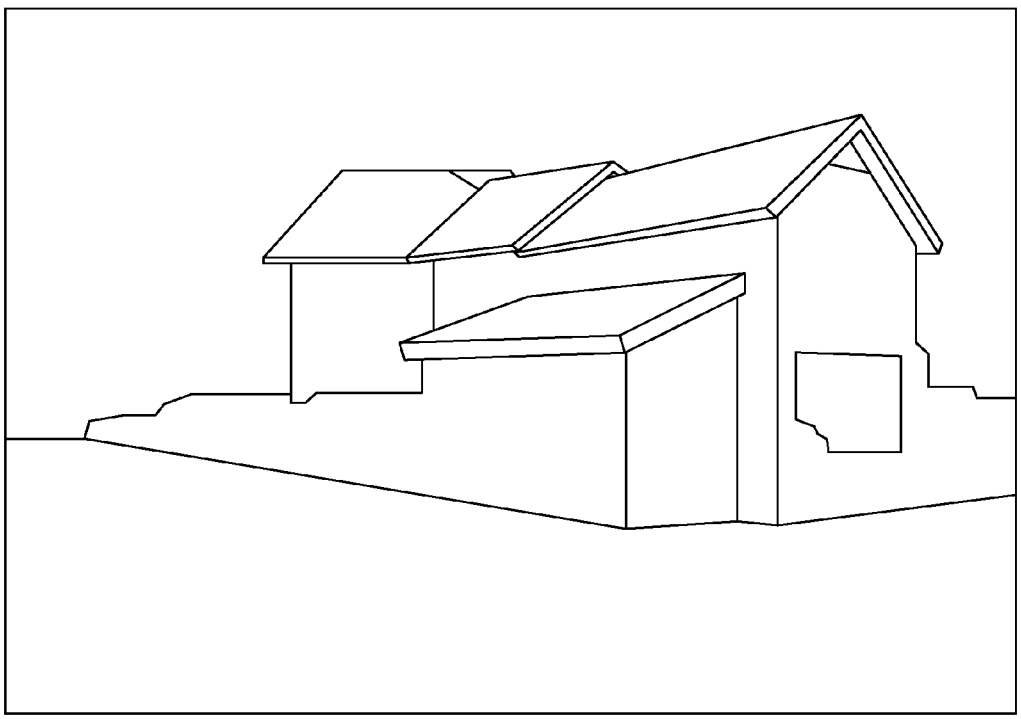
FIGS. 3C-3E illustrates candidate planes for the different three-dimensional viewpoints generated by the computerized reconstruction server, in accordance with embodiments of the invention.
Figure 3D:
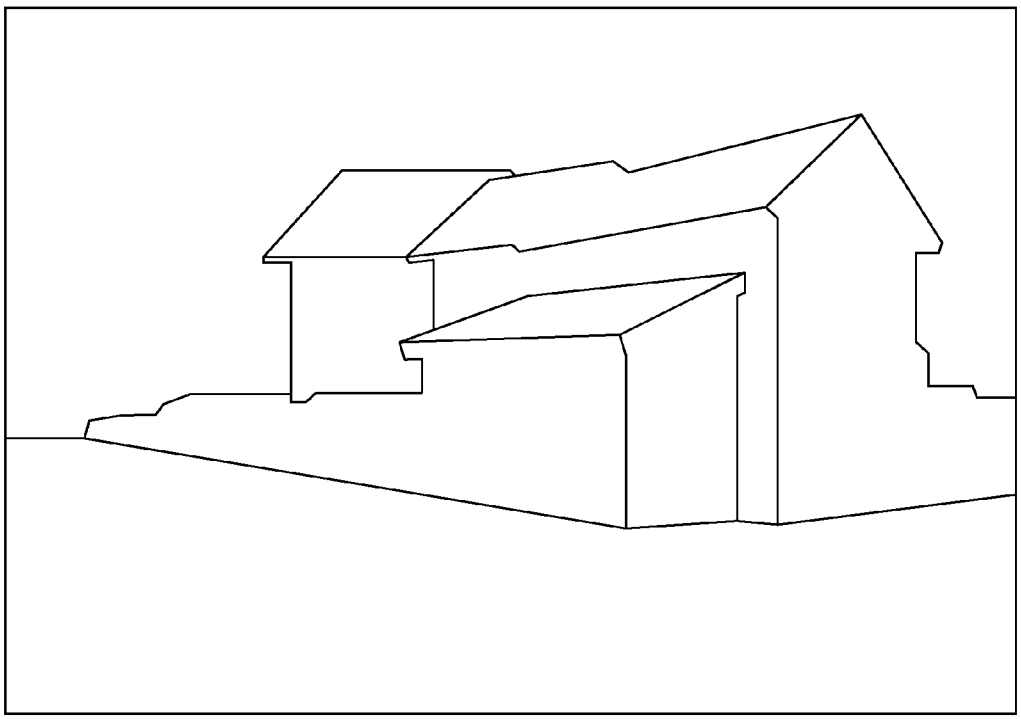
Figure 3E:
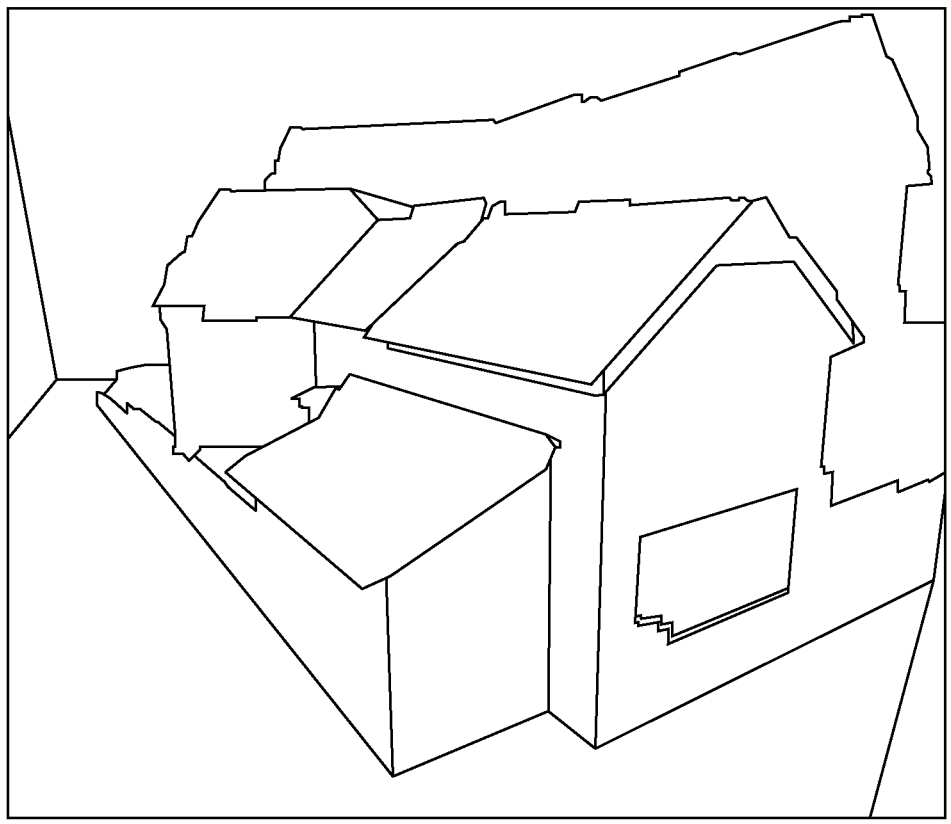

FIG. 2 is an image diagram that illustrates exemplary two-dimensional images in accordance with embodiments of the invention. The two-dimensional images capture different views of a home. In one embodiment, the two-dimensional images of FIGS. 2A and 2B are captured by a camera. In turn, the two-dimensional images are processed by the computerized reconstruction server to generate a three-dimensional scene.

In some embodiments, the three-dimensional scene is reconstructed by performing structure from motion on each two-dimensional image to extract image features and camera calibrations. In turn, the image features and camera calibrations are used by the computerized reconstruction server to identify candidate planes for the three-dimensional scene. The plane candidates are organized by the computerized reconstruction server and rendered based on overall global consistency within the three-dimensional scene.

FIG. 3 is a plane diagram that illustrates exemplary three-dimensional planes in accordance with embodiments of the invention. FIG. 3A illustrates the structure from motion feature extraction and camera calibration determinations performed by the computerized reconstruction server on the two-dimensional images that capture different views of the scene. The image features (e.g., lines, points, colors, pixels, etc.) and camera calibrations (e.g., orientation, location, etc.) are used to generate three-dimensional lines and planes. FIG. 3B illustrates the three-dimensional lines generated by the computerized reconstruction server. FIG. 3C-3E illustrates the candidate planes for the different three-dimensional viewpoints generated by the computerized reconstruction server.

The computerized reconstruction server generates a depth map and proxy mesh of the three-dimensional scene based on the image features and camera calibrations. In turn, the three-dimensional scene is rendered using estimated three-dimensional planes, depth maps, and proxy meshes. In some embodiment, the computerized reconstruction system colors the three-dimensional scene and provides transitions between viewpoints associated with the three-dimensional scenes.

Figure 4A:
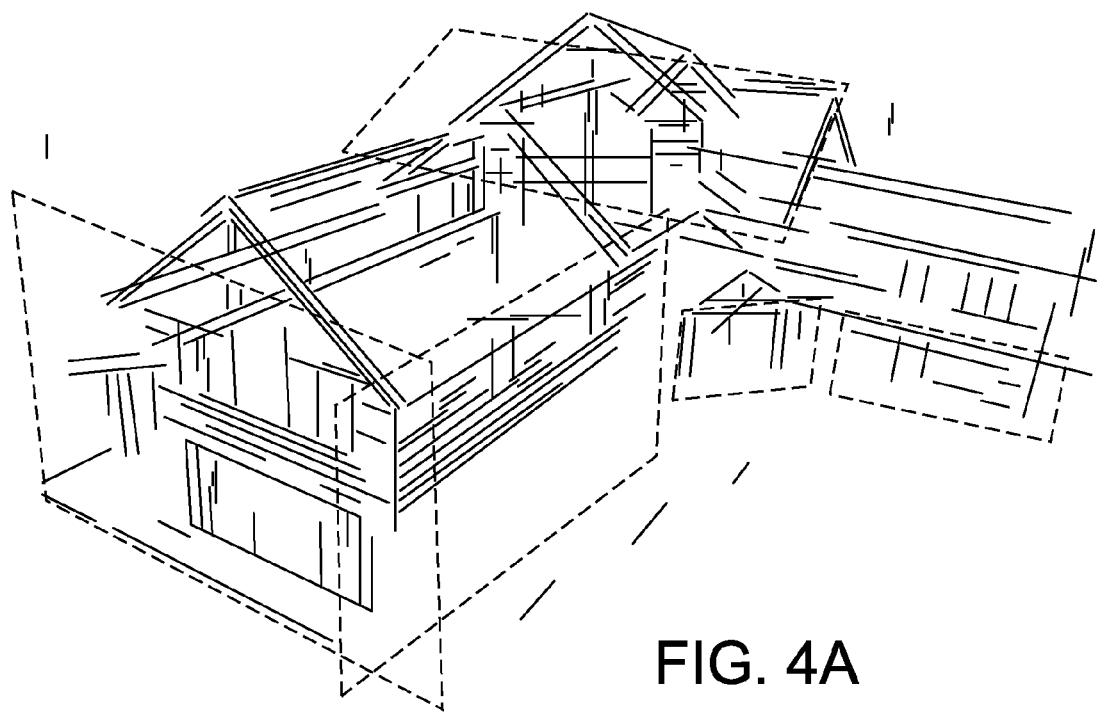
FIG. 4A illustrates a depth map generated by the computerized reconstruction server, in accordance with embodiments of the invention.
Figure 4B:
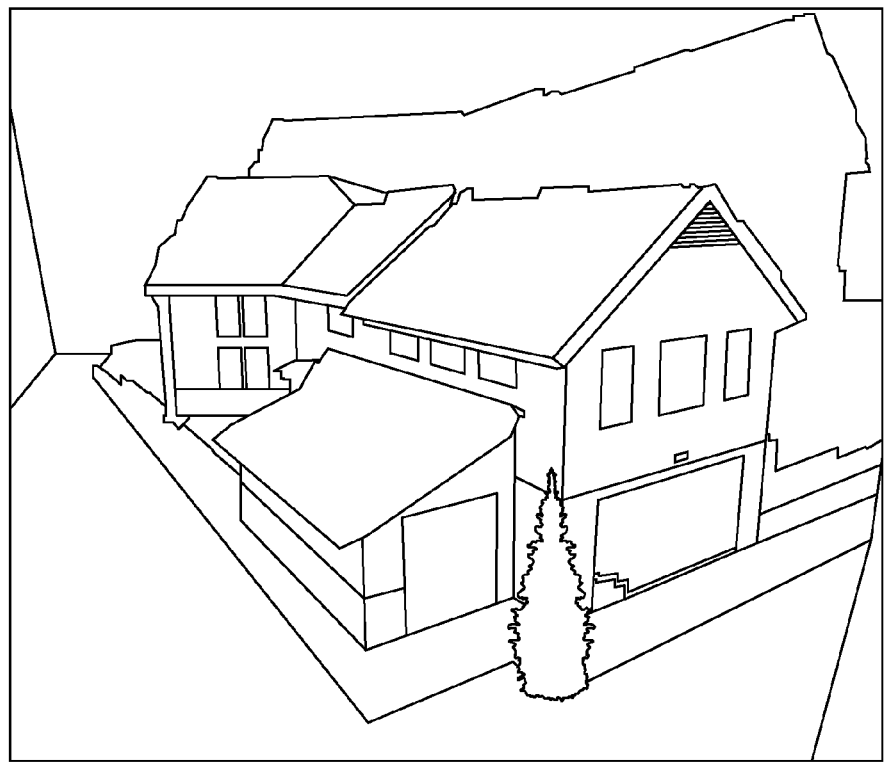
FIG. 4B illustrates proxy meshes generated by the computerized reconstruction server, in accordance with embodiments of the invention.
Figure 4C:
FIG. 4C illustrates textured proxy meshes generated by the computerized reconstruction server, in accordance with embodiments of the invention.

FIG. 4 is a three-dimensional scene diagram that illustrates an exemplary scene generated by the computing system in accordance with embodiments of the invention. The computerized reconstruction system generates the depth map illustrated in FIG. 4A for the views of the three-dimensional scene. In turn, proxy meshes are used by the computerized reconstruction system to provide texture to the three-dimensional scene. The proxy meshes are illustrated in FIG. 4B. The computerized reconstruction server also performs texture mapping on the proxy meshes. A texture mapped proxy mesh is illustrated in FIG. 4C.

In one embodiment, the computerized reconstruction system detects vanishing directions in the two-dimensional image. The computerized reconstruction server constructs three-dimensional lines based on the vanishing directions. In turn, the vanishing directions and three-dimensional lines and points are used to generate candidate planes, which define the proxy mesh for the three-dimensional scene.

Figure 5A:
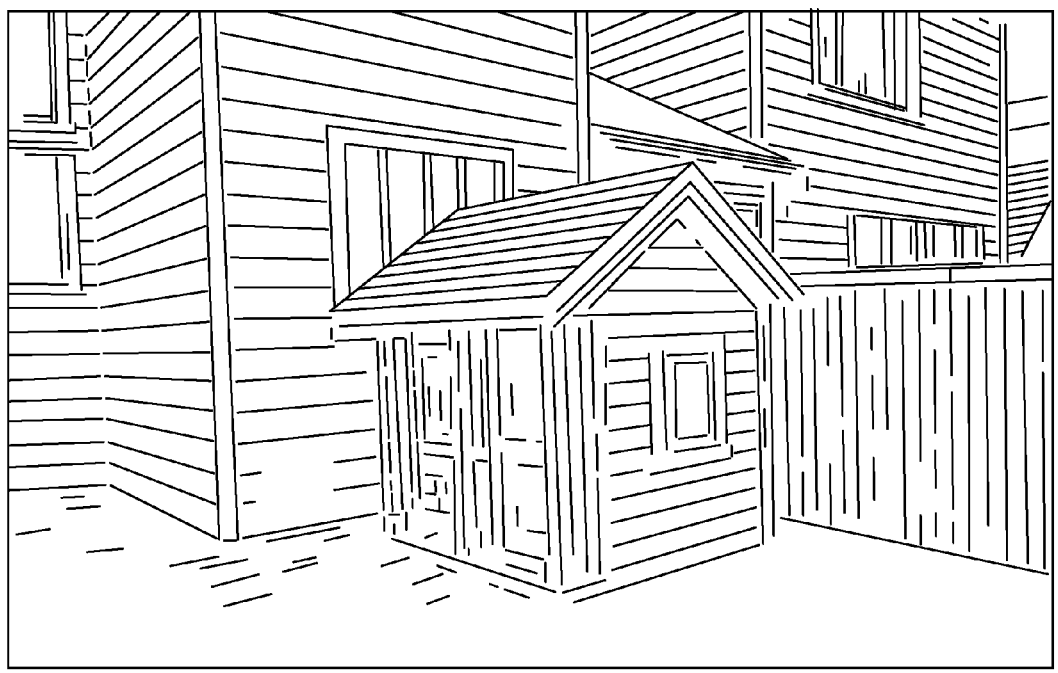
FIG. 5A illustrates an exemplary two dimensional image that is processed by the computerized reconstruction system to extract vanishing directions, in accordance with embodiment of invention.
Figure 5B:
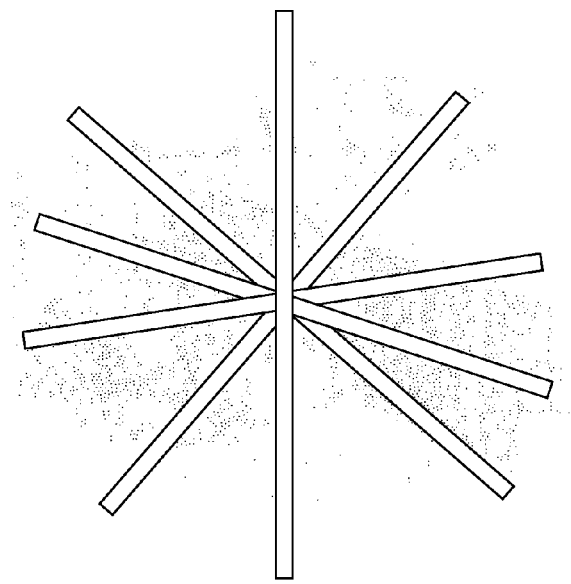
FIG. 5B illustrates the orientation of each cluster of vanishing directions extracted from the two-dimensional image, in accordance with embodiments of the invention.
Figure 5C:
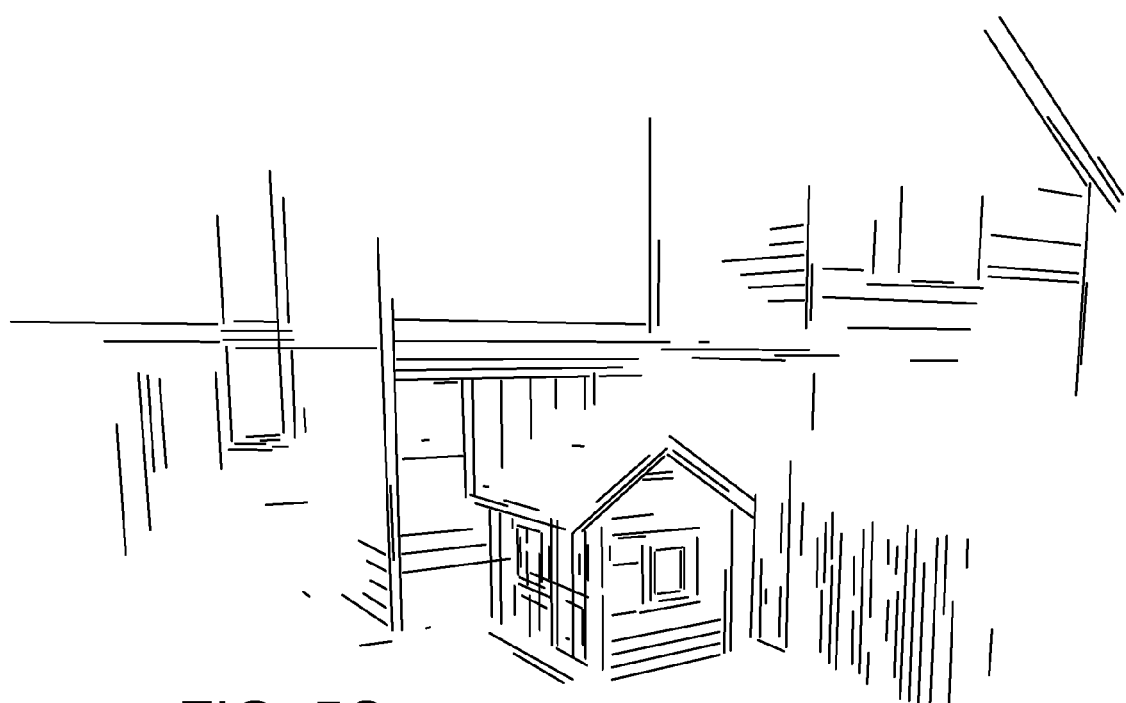
FIG. 5C illustrates an exemplary reconstruction of a three-dimensional scene rendered by the computerized server, in accordance with embodiments of the invention.

FIG. 5 is a vanishing direction diagram that illustrates detection of vanishing directions within two-dimensional images in accordance with embodiments of the invention. A two dimensional image is received by the computerized reconstruction system. FIG. 5A illustrates an exemplary two dimensional image that is processed by the computerized reconstruction system to extract vanishing directions. FIG. 5B illustrates the orientation of each cluster of vanishing directions extracted from the two-dimensional image. The computerized reconstruction server identifies the three-dimensional lines that corresponds to the vanishing directions and the corresponding image features. FIG. 5C illustrates an exemplary reconstruction of a three-dimensional scene rendered by the computerized server using the vanishing directions and the generated three-dimensional lines.

The computerized reconstruction server adjusts the three-dimensional scenes based on the uncertainty associated with the depth maps for the three-dimensional scenes. The plane detection performed by the computerized reconstruction server accounts for this uncertainty by computing a vector along the viewing direction of a three-dimensional point located on or proximate to a plane generated by the computerized reconstruction server. In turn, the computerized reconstruction server estimates a normal to the surface of the three-dimensional point to estimate the orientation of a plane passing through the three-dimensional point.

Figure 6A:
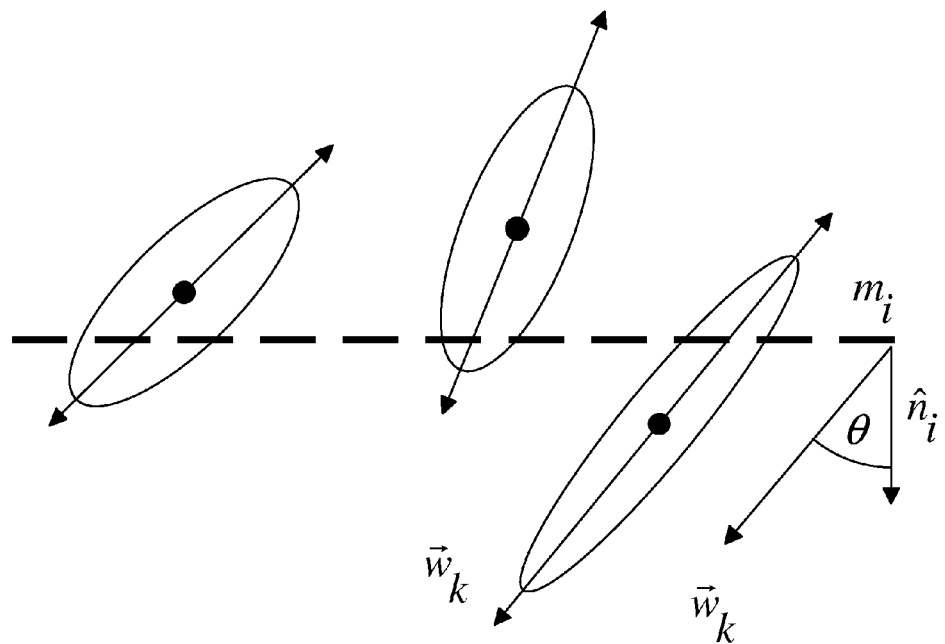
FIG. 6A illustrates a measure of the covariance for three-dimensional points, in accordance with embodiments of the invention.
Figure 6B:
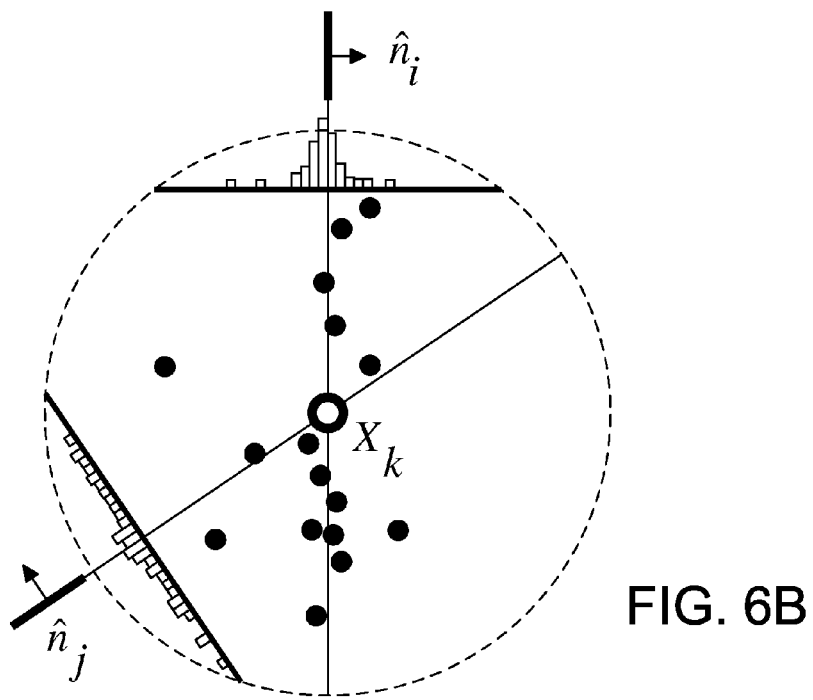
FIG. 6B illustrates the distribution of the normal for the planes that pass through a three-dimensional point, in accordance with embodiments of the invention.

FIG. 6 is a normal orientation diagram that illustrates probable distribution of surface normals in accordance with embodiments of the invention. The computerized reconstruction system determines the covariance ($\vec{w}_k$) for each three-dimensional point around a three-dimensional point $X_k$. FIG. 6A illustrates a measure of the covariance $\vec{w}_k$ for three-dimensional points around the three-dimensional point $X_k$. Also, the computerized reconstruction server evaluates a distribution of the surface normals $\hat{n}$ among the three-dimensional points proximate to $X_k$. The normals are used to by the computerized reconstruction system to determine an orientation of the plane that passes through the three-dimensional point $X_k$. FIG. 6B illustrates the distribution of the normal for the planes that pass through three-dimensional point $X_k$.

In some embodiments, the distribution of the normal do not have strong unique peaks and votes from multiple viewpoints and associated image features are used to estimate the orientation of the plane. The computerized reconstruction server may collect votes regarding the orientation of the plane from three-dimensional points and lines. In turn, the distribution of the votes are used to determine the orientation of the planes.

Figure 7A:
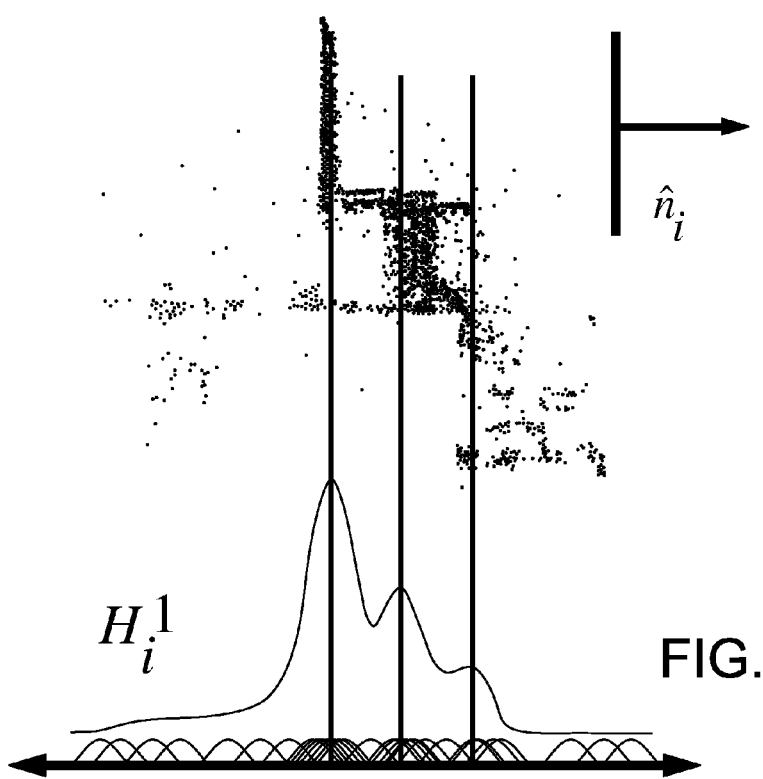
FIG. 7A illustrates a histogram that represents the distribution of normals based on votes from three-dimensional points, in accordance with embodiments of the invention.
Figure 7B:
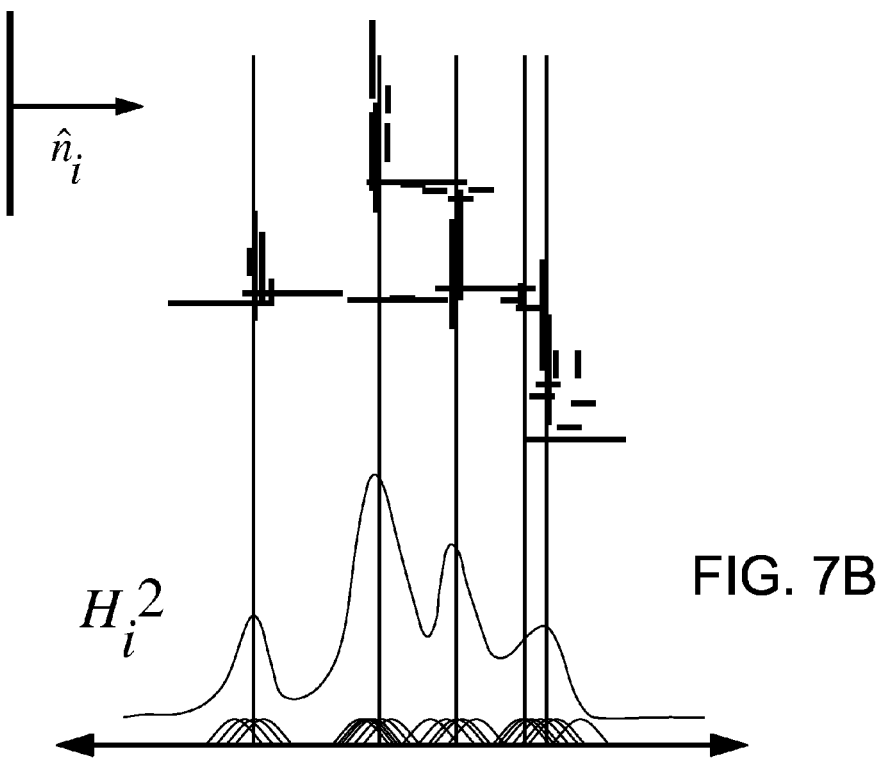
FIG. 7B illustrates a histogram that represents the distribution of normals based on votes from the three-dimensional lines, in accordance with embodiments of the invention.

FIG. 7 is a distribution histogram that illustrates probable distribution of the orientation of the planes or three-dimensional lines in accordance with embodiments of the invention. The distribution of the votes from the three-dimensional points and lines are evaluated by the computerized reconstruction server in a histogram. FIG. 7A illustrates histogram $H_i^1$ that represents the distribution of normals based on votes from the three-dimensional points. FIG. 7B illustrates histogram $H_i^2$ that represents the distribution of normals based on votes from the three-dimensional lines. The dominate normals are assigned as orientations to the planes identified by the computerized reconstruction server.

The computerized reconstruction server executes a graph-cut optimization that considers ray visibility when assigning pixels to planes. The ray visibility information extracted from the two dimensional images and corresponding three-dimensional lines and points are used as data terms in the objective function utilized to perform the graph-cut optimizations. Any plane that intersects a visibility ray from the plane corresponding to the three-dimensional line or point to the corresponding viewpoint is assigned a penalty.

Figure 8:
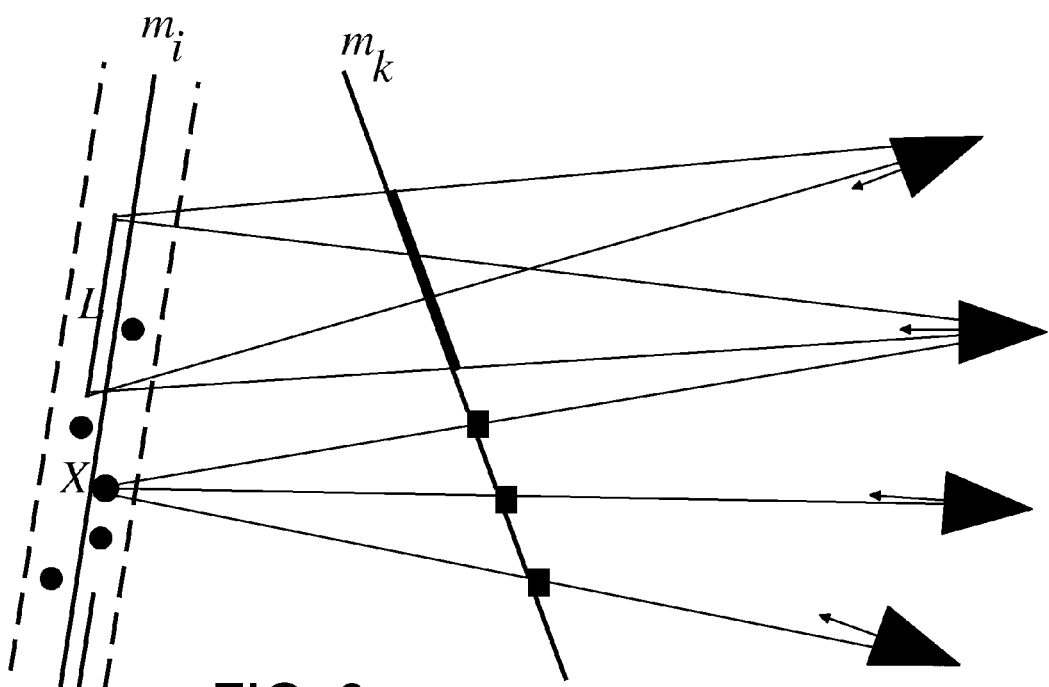
FIG. 8 is a visibility diagram that illustrates scene information extracted from the two-dimensional images in accordance with embodiments of the invention.

FIG. 8 is a visibility diagram that illustrates scene information extracted from the two-dimensional images in accordance with embodiments of the invention. The plane $m_i$ is associated with three-dimensional line L and three-dimensional point X. The three-dimensional line L and three-dimensional point X are visible at multiple viewpoints. A plane $m_k$ intersects a visibility ray from the plane $m_i$ to the corresponding viewpoints. The optimization function executed by the computerized reconstruction system will assign the plane $m_k$ a high visibility cost because it intersects the visibility rays between the viewpoints and the plane $m_i$.

The three-dimensional pixels and planes are organized in a graph by the computerized reconstruction server. A graph-cut optimization is executed by the computerized reconstruction system to select the optimal assignment of pixels to planes. The graph-cut optimization evaluates data terms and smoothness terms associated with each edge connecting a plane and a pixel.

Figure 9:
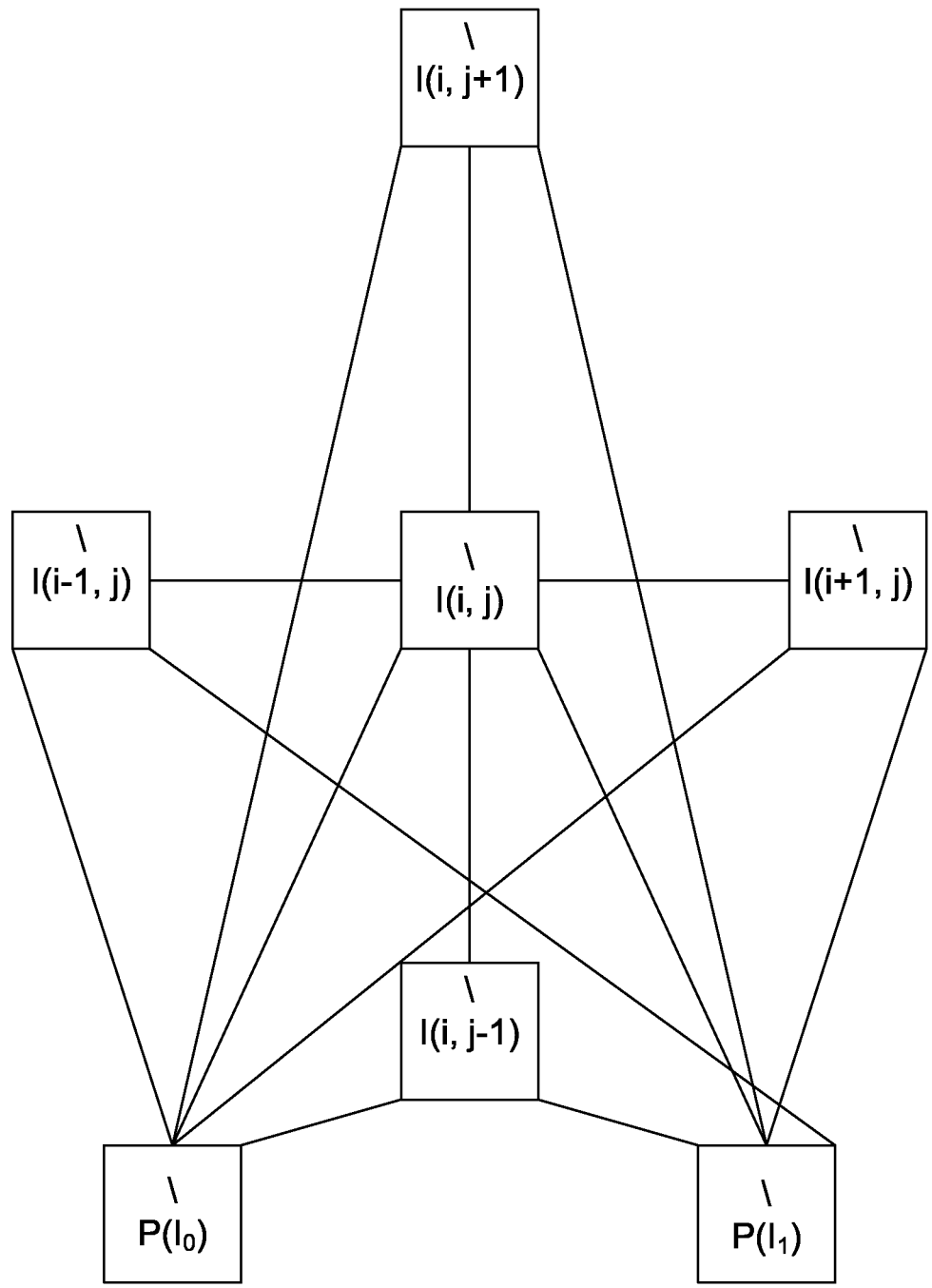
FIG. 9 is a graph diagram that illustrates assignment of pixels to labels that represent planes using a Markov Random Field representation and graph cut minimization in accordance with embodiments of the invention.

FIG. 9 is a graph diagram that illustrates assignment of pixels to labels that represent planes using a Markov Random Field representation and graph cut minimization in accordance with embodiments of the invention.

The graph includes nodes corresponding to the pixels in the two-dimensional images and labels corresponding to planes in the three-dimensional scene. The graph may represent the Markov Random Field for the three-dimensional scene. Each pixel l(i,j) is assigned to a plane P(i,j). The edge connecting the pixel l(i,j) and plane P(i,j) is assigned a cost based on the data terms and smoothness terms evaluated by the computerized reconstruction system. The cut cost is the sum of the edges that are removed or cut. The edges connecting the pixels l(i,j) and planes P(i,j) are removed to minimize the objective function that measures the overall cost of assigning each pixel to a plane in the three-dimensional scene.

In some embodiments, the computerized reconstruction system measures photo-consistency by warping a neighboring image in the collection of two-dimensional images. In turn, the computerized reconstruction server measures the similarity between the warped and image and the neighboring image. The similarity score for multiple neighbors are averaged by the computerized reconstruction system to evaluate the photo-consistency measure, which is used as a data term in the graph-cut optimization.

Figure 10A:
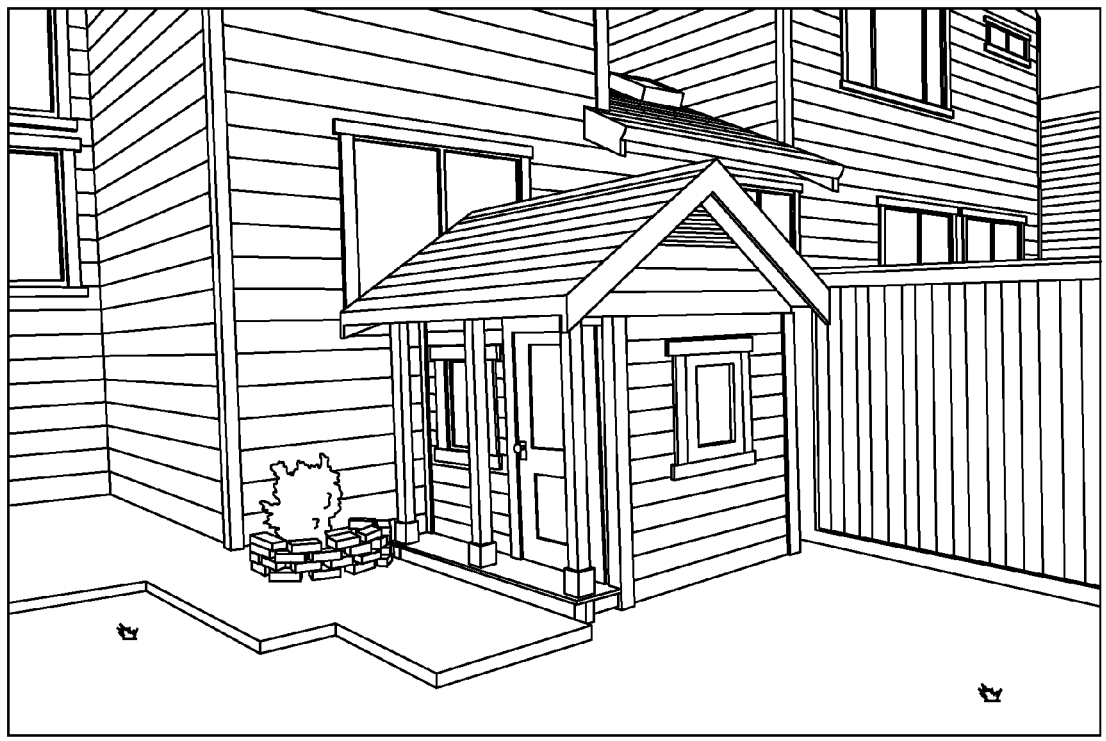
FIG. 10A illustrates an exemplary reference image, in accordance with embodiments of the invention.
Figure 10B:
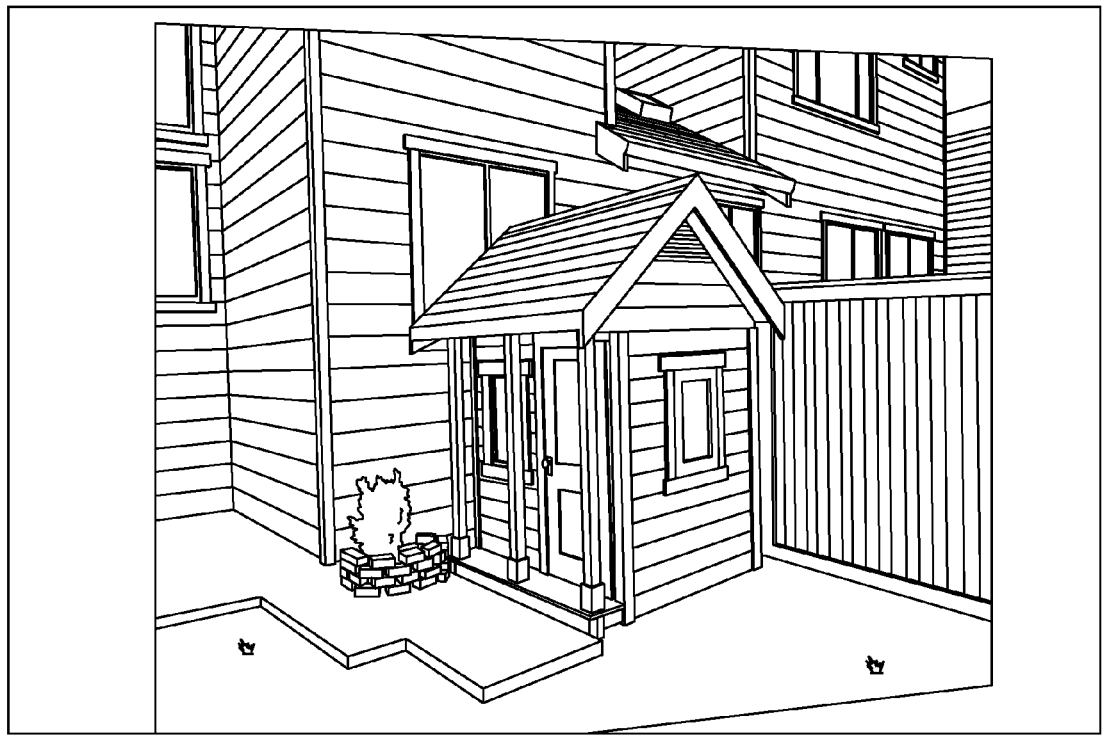
FIG. 10B illustrates an exemplary warped neighbor image that is used by the computerized reconstruction system, in accordance with embodiments of the invention.
Figure 10C:
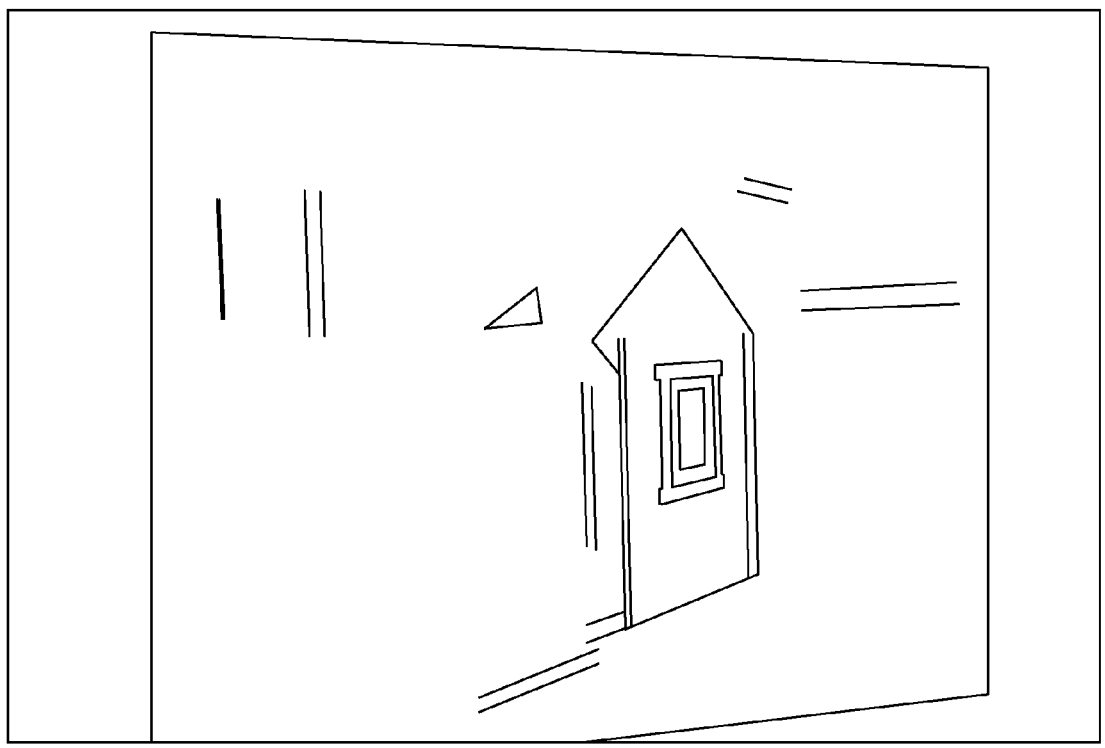
FIG. 10C illustrates a measure of the photo consistency between the reference image and the warped image determined by the computerized reconstruction server, in accordance with embodiments of the invention.

FIG. 10 is a photo-consistency diagram that illustrates the relationship between two-dimensional images used to generate the three-dimensional scene in accordance with embodiments of the invention. The computerized reconstruction server identifies a reference image selected from the collection of two-dimensional images. FIG. 10A illustrates an exemplary reference image. In turn, the neighboring two-dimensional images are selected and warped to calculate the photo-consistency. FIG. 10B illustrates an exemplary warped neighbor image that is used by the computerized reconstruction system. FIG. 10C illustrates a measure of the photo consistency between the reference image and the warped image determined by the computerized reconstruction server.

The smoothness terms of the graph-cut optimization are used to ensure pixels and planes are assigned to ensure smooth boundary transitions. The computerized reconstruction server identifies the crease lines and occlusion lines included in the two dimension. In turn, the computerized reconstruction server evaluates the smoothness terms based on the locations of the pixels and planes associated with the crease lines, occlusion lines, and other lines in the two-dimensional scene.

Figure 11A:
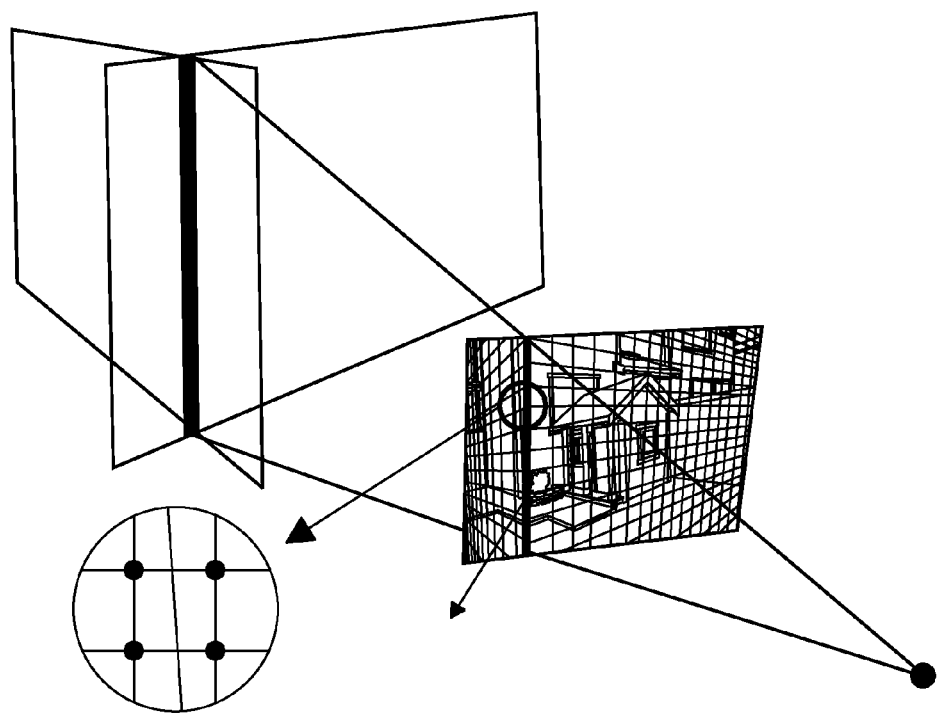
FIG. 11A illustrates crease edges, in accordance with embodiments of the invention.
Figure 11B:
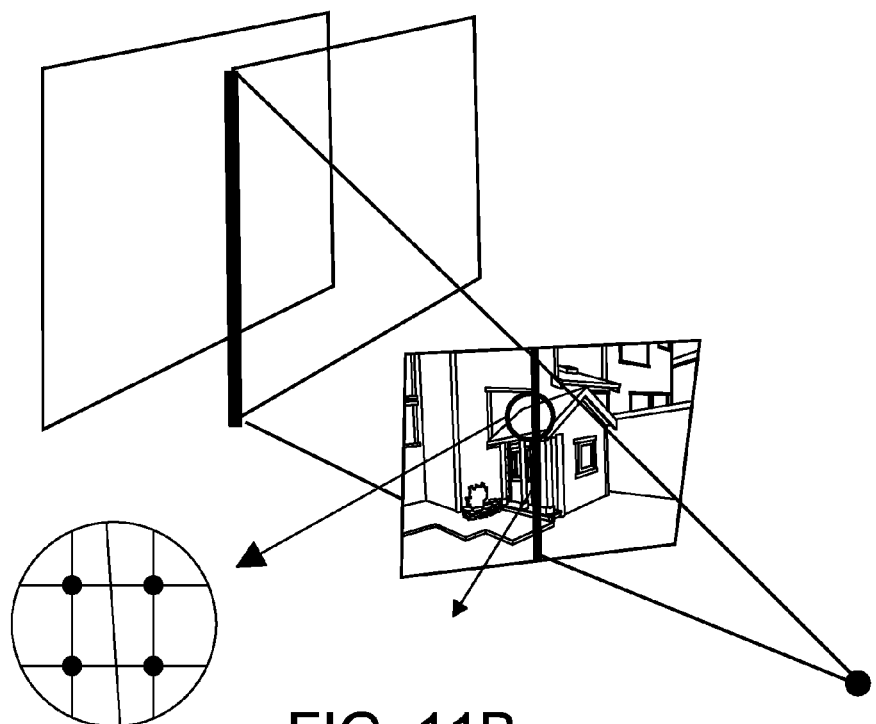
FIG. 11B illustrates occlusion boundaries, in accordance with embodiments of the invention.
Figure 12A:
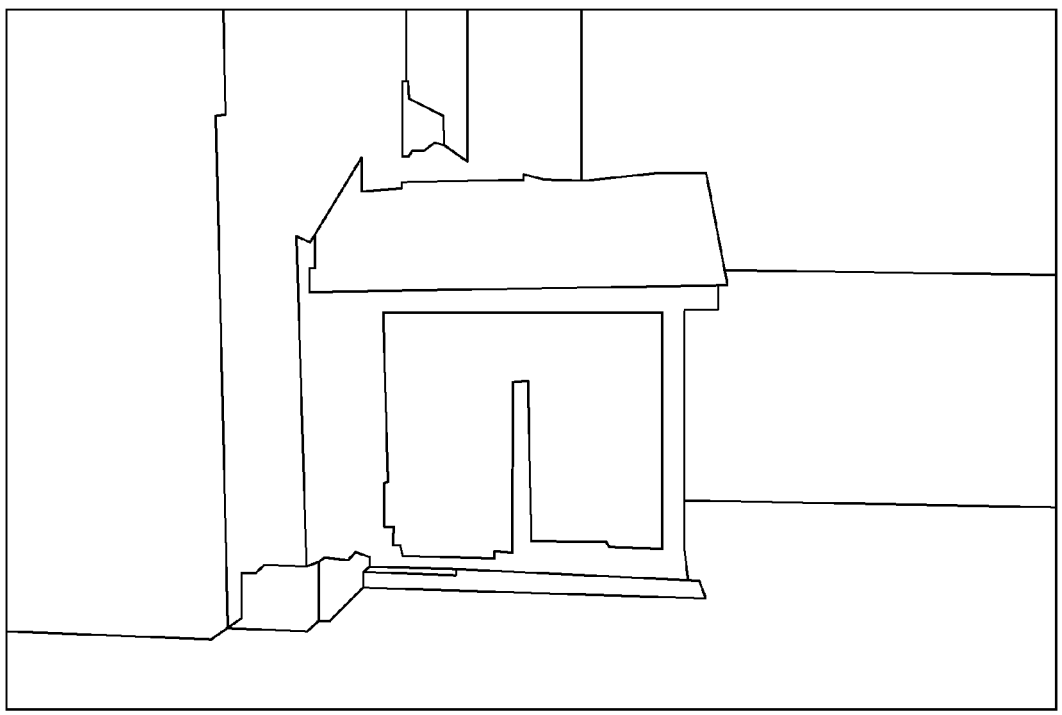
FIG. 12A-B are transition diagrams that illustrate navigation between view points in a three-dimensional playhouse scene, in accordance with embodiments of the invention.
Figure 12B:
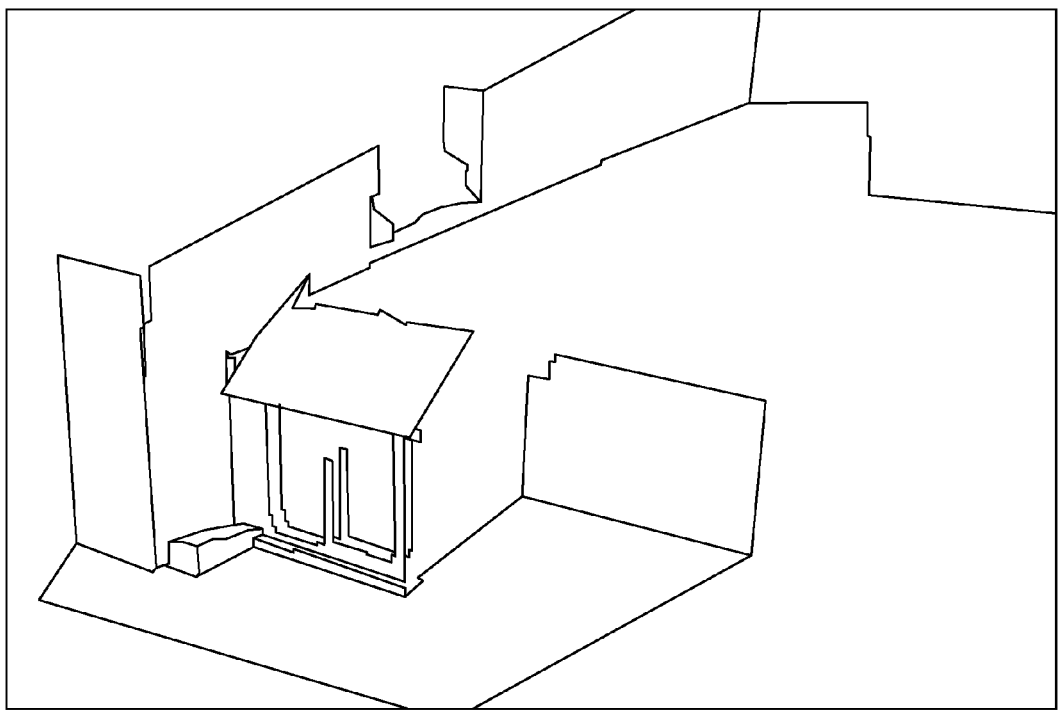
Figure 13A:
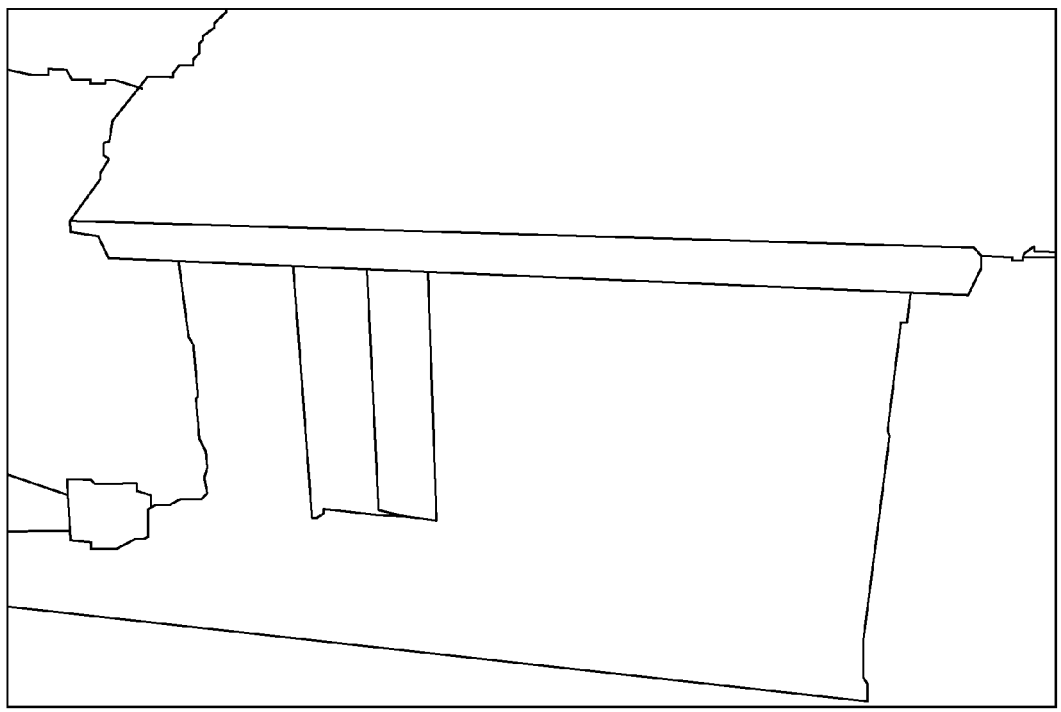
FIG. 13A-B are transition diagrams that illustrate navigation between view points in the three-dimensional shed scene, in accordance with embodiments of the invention.
Figure 13B:
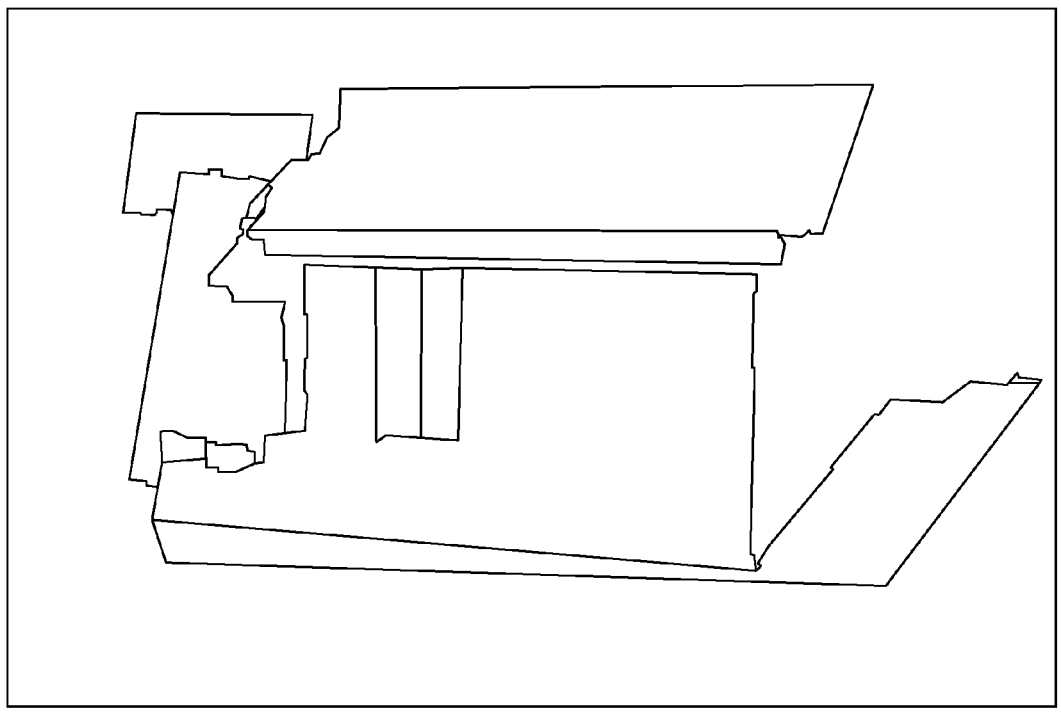
Figure 14A:
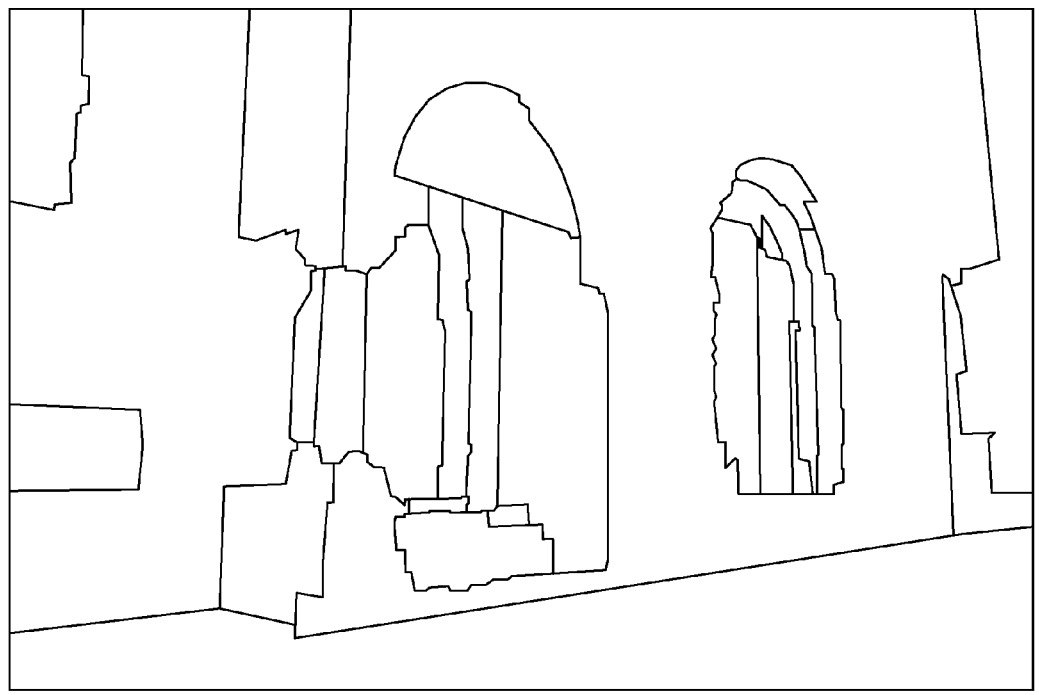
FIG. 14A-B are transition diagrams that illustrate navigation between view points in the three-dimensional arch scene, in accordance with embodiments of the invention.
Figure 14B:
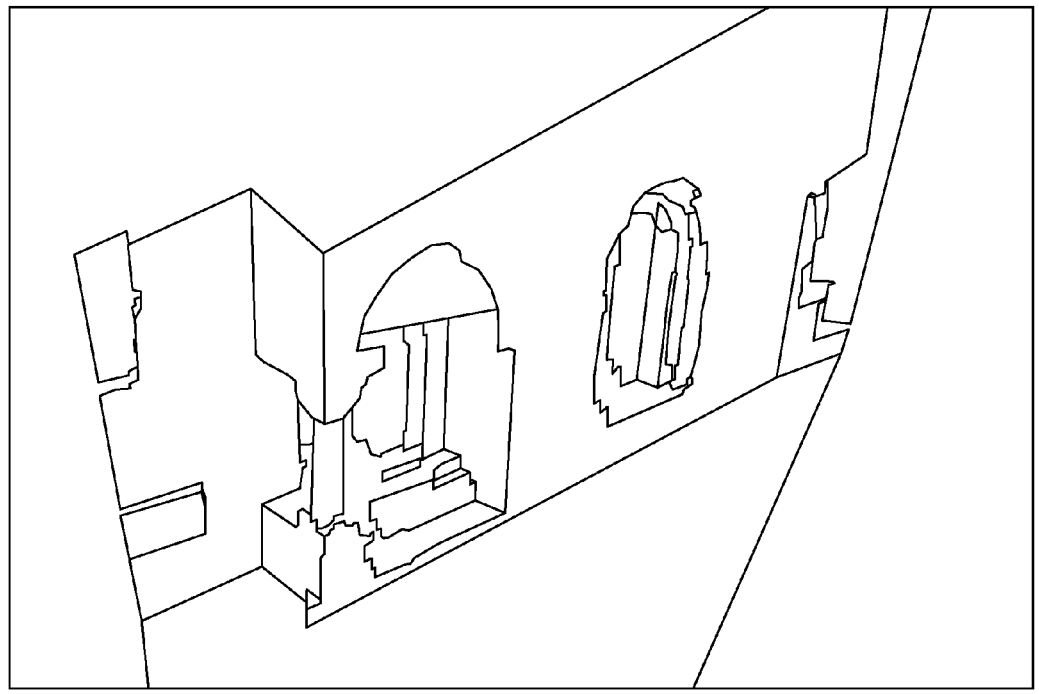
Figure 15A:
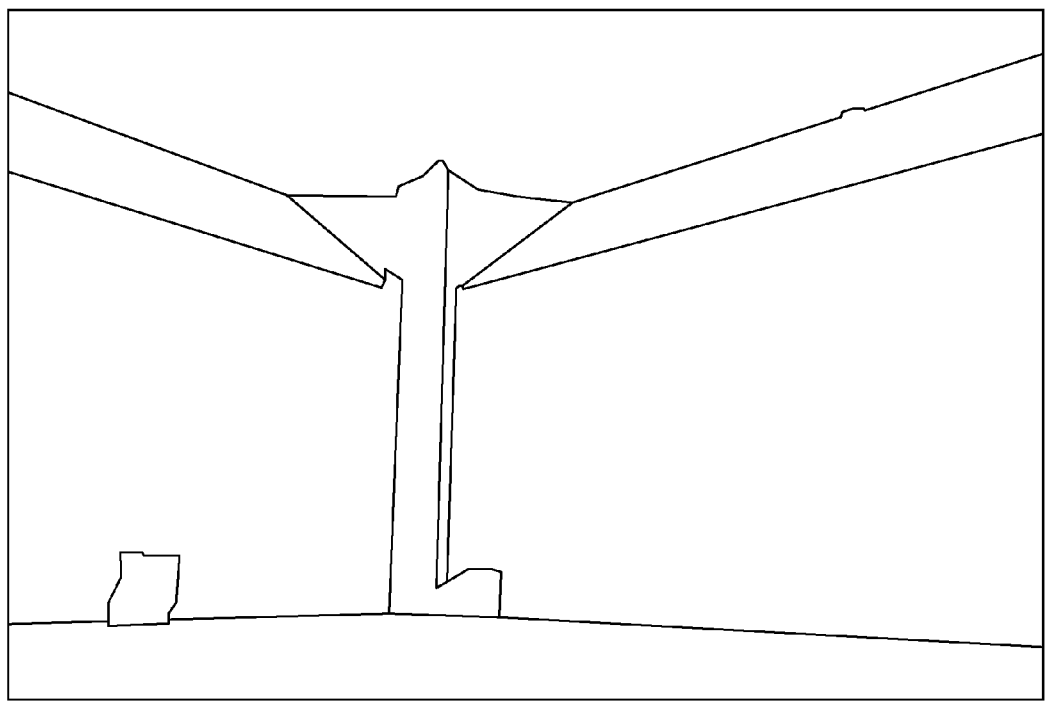
FIG. 15A-B are transition diagrams that illustrate navigation between view points in the three-dimensional castle scene, in accordance with embodiments of the invention.
Figure 15B:
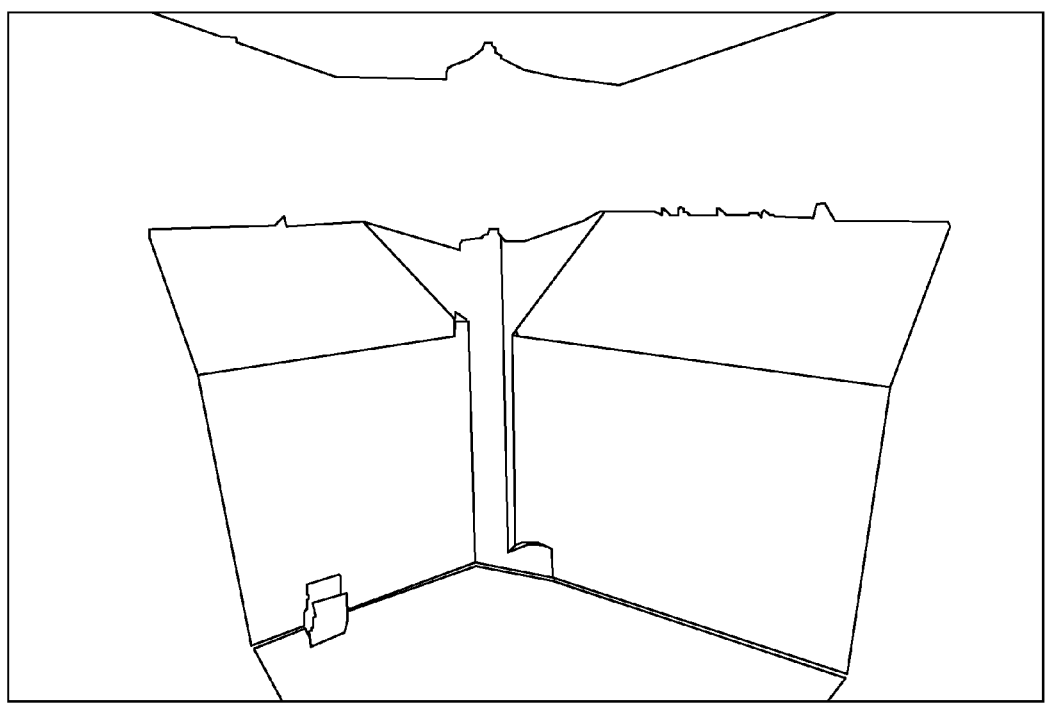
Figure 16A:
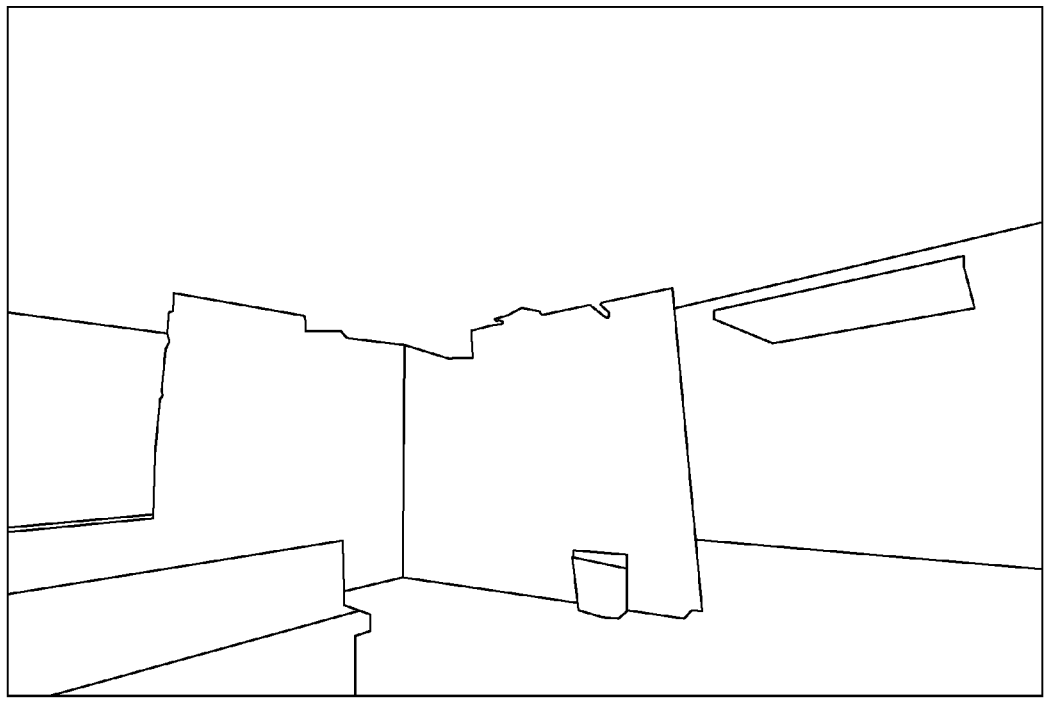
FIG. 16A-B are transition diagrams that illustrate navigation between view points in the three-dimensional room scene, in accordance with embodiments of the invention.
Figure 16B:
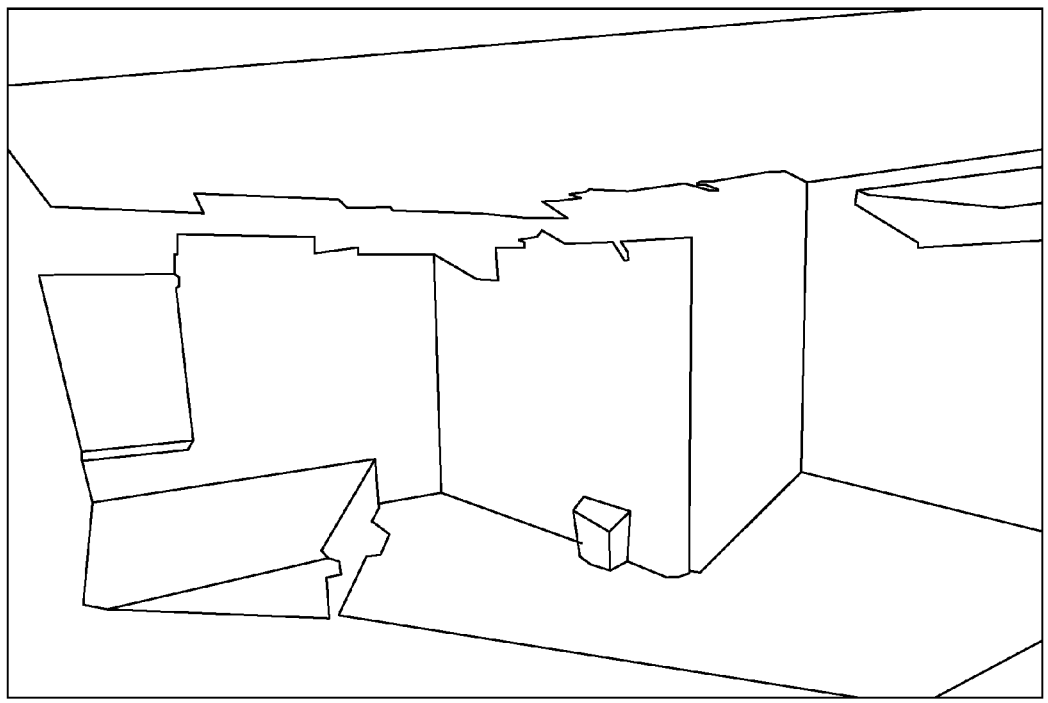
Figure 17A:
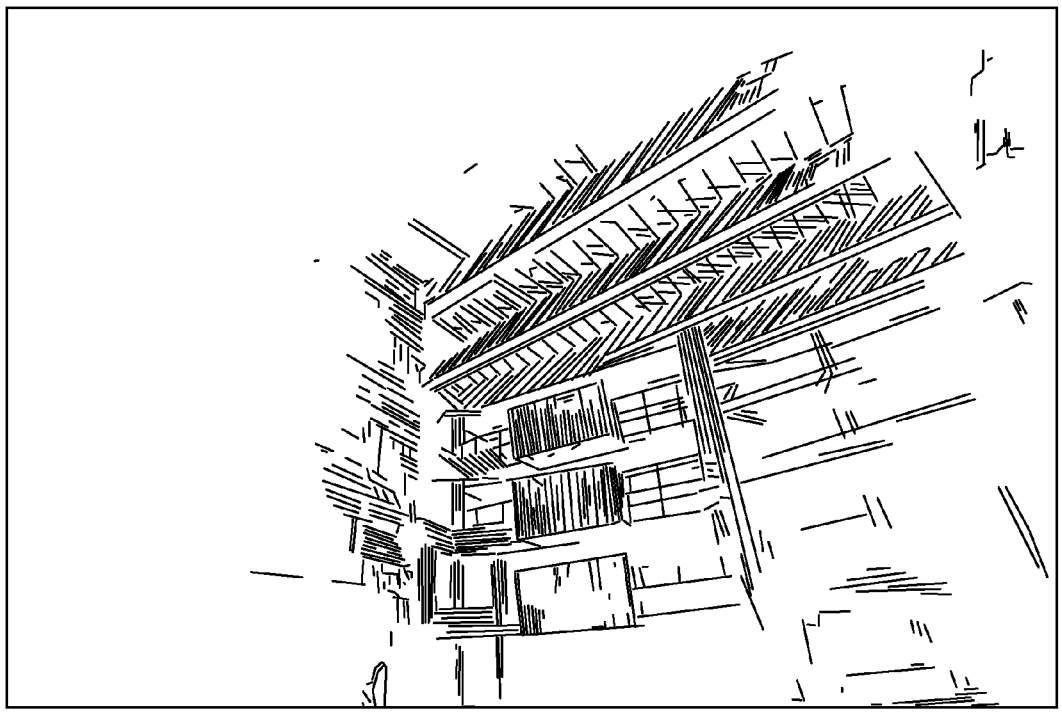
FIG. 17A-E are transition diagrams that illustrate navigation between view points in the three-dimensional lobby scene, in accordance with embodiments of the invention.
Figure 17B:
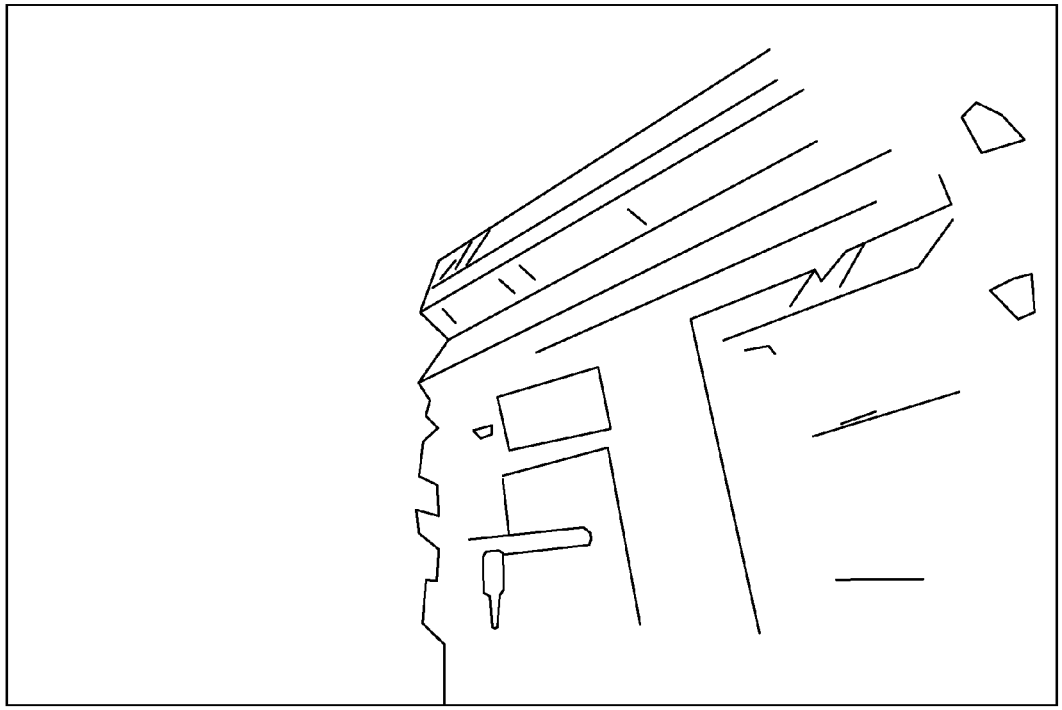
Figure 17C:
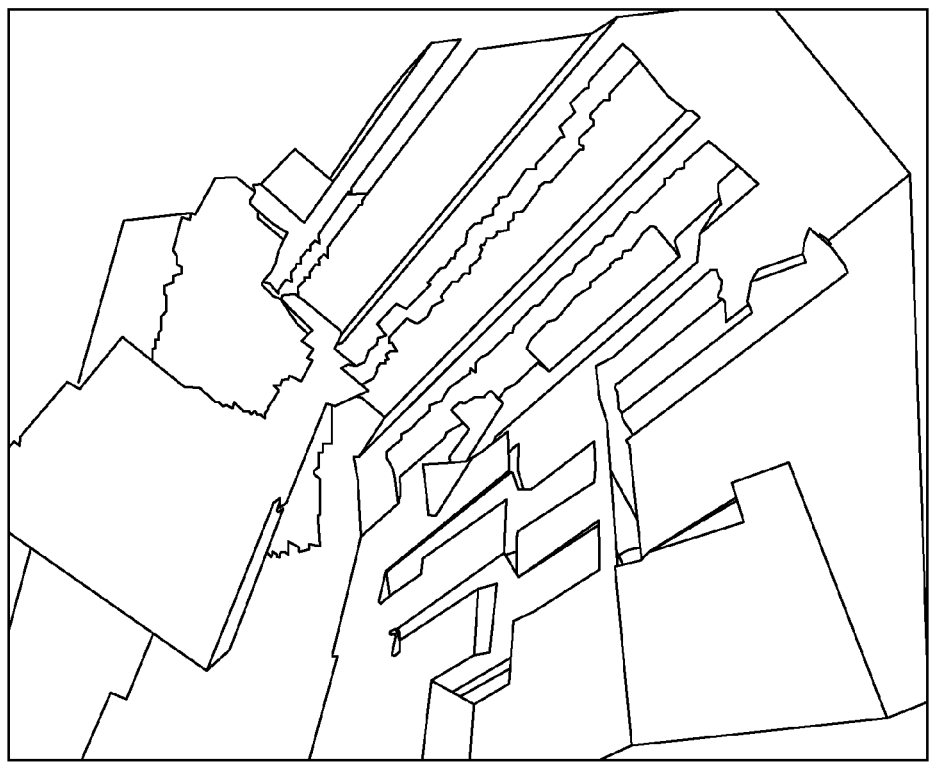
Figure 17D:
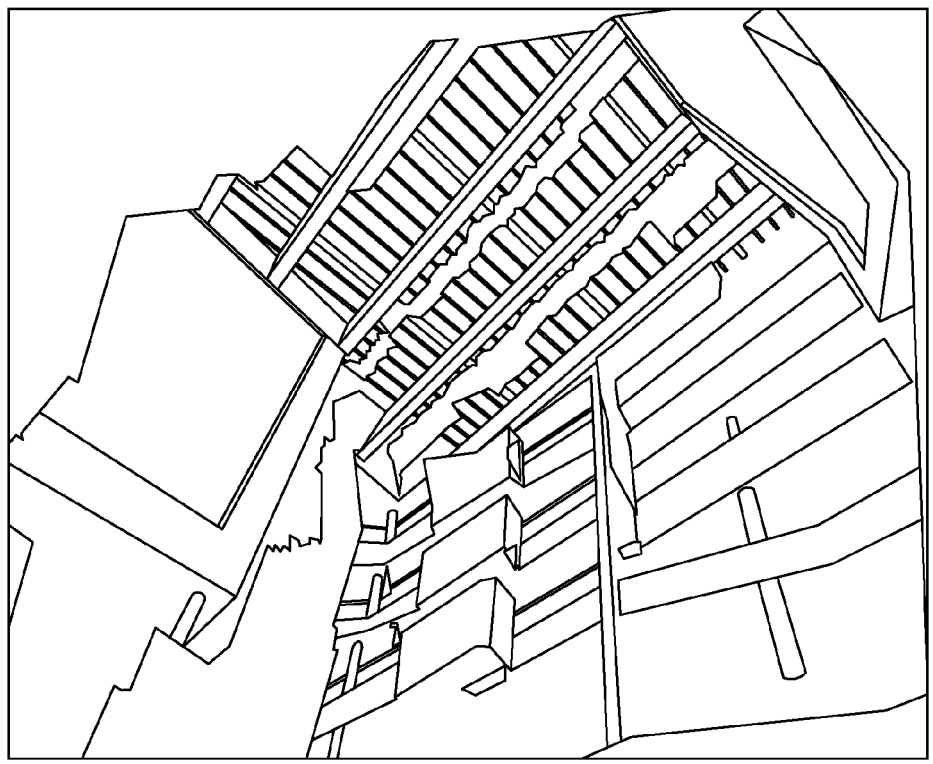
Figure 17E:
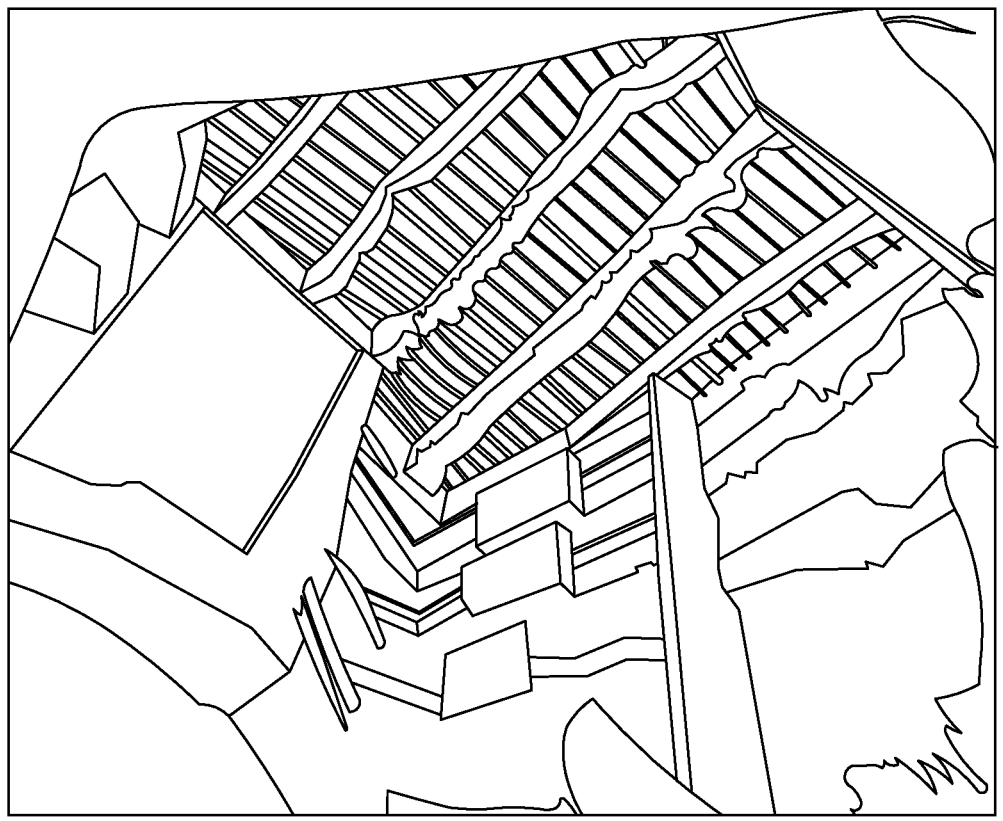

FIG. 11 is a boundary diagram that illustrates crease edges corresponding to the intersection of a pair of planes and occlusion boundaries for planes in the three-dimensional scene in accordance with embodiments of the invention.

The computerized reconstruction server identifies crease lines in the two dimensional images. The crease lines are illustrated in FIG. 11A. The crease lines are used to calculate a smoothness term for the boundary between the planes that create the crease line. The computerized reconstruction server identifies the occlusion lines in the two-dimensional images. The occlusion lines are illustrated in FIG. 11A. The occlusion lines are used to calculate a smoothness term for the boundary associated with the planes that create the occlusion line.

The proxy mesh is generated based on the pixel and plane assignments provided by the computerized reconstruction server. In turn, the computerized reconstruction server maps textures to planes in the proxy mesh and displays the textured mapped mesh to a user. The computerized reconstruction system also interpolates views of the three-dimensional scene to provided navigation within the three-dimensional scene.

FIG. 12-17 are transition diagrams that illustrates possible navigation between view points in various three-dimensional scenes in accordance with embodiments of the invention.

In some embodiment, the computerized reconstruction server performs a method to render a navigable three-dimensional scene. A collection of two-dimensional images are received and processed to extract image features and camera calibrations. The computerized reconstruction server identifies three-dimensional lines captured in the scene by a camera and uses the vanishing directions, image features, and camera calibrations to generate multiple planes for the three-dimensional scene.

Figure 18:
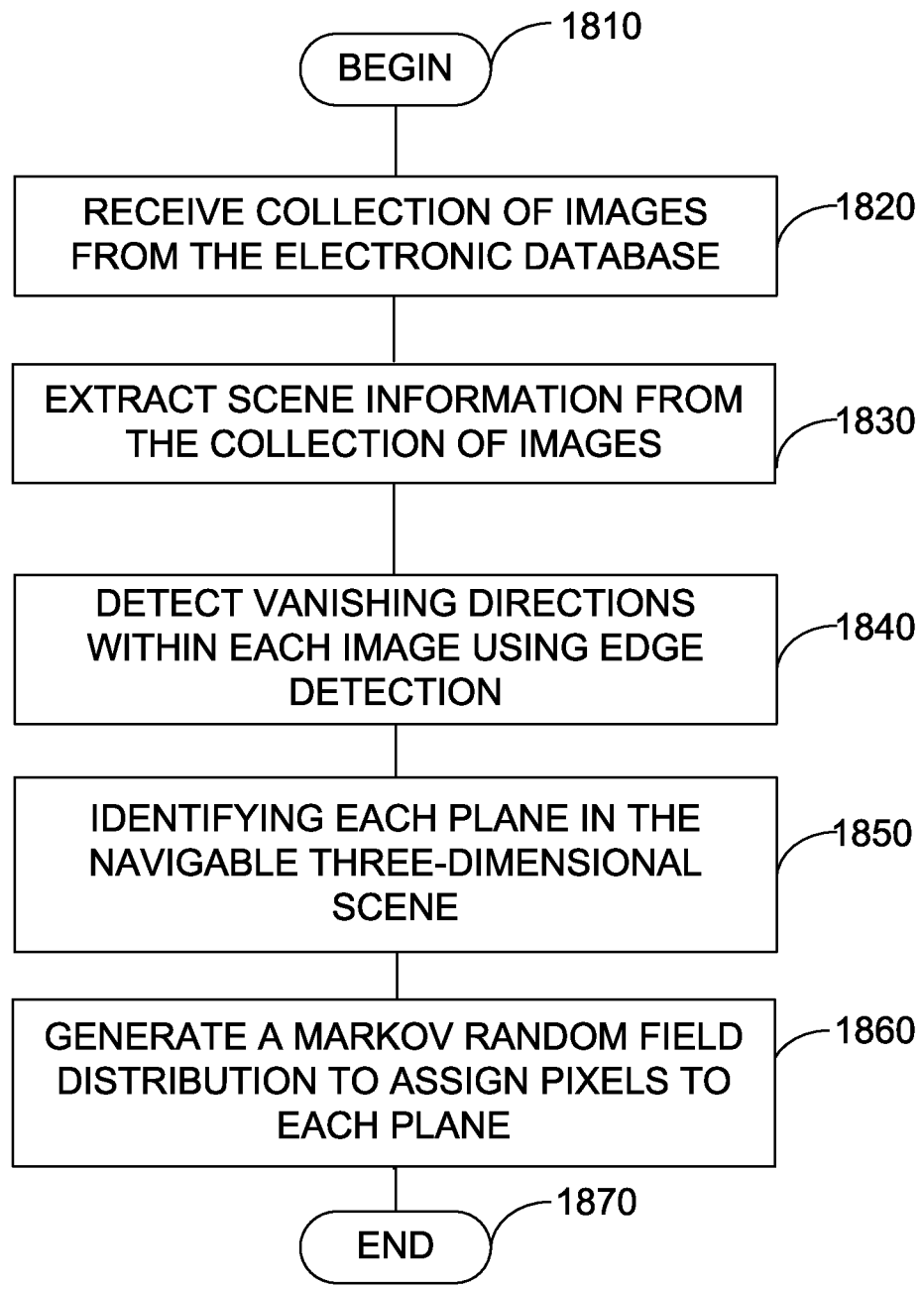
FIG. 18 is a logic diagram that illustrates a method to select planes that are used to render a navigable three-dimensional scene from a collection of images stored in an electronic database in accordance with embodiments of the invention.

FIG. 18 is a logic diagram that illustrates a method to select planes that are used to render a navigable three-dimensional scene from a collection of images stored in an electronic database in accordance with embodiments of the invention. The method begins in step 1810. In step 1820, a collection of images is received from the electronic database by the computerized reconstruction server. In step 1830, the computerized reconstruction server extracts scene information from the collection of images. The scene information may include camera calibrations, a three-dimensional point cloud, three-dimensional line segments, and data for multi-view correspondence of points and lines.

In turn, the computerized reconstruction server detects vanishing directions within each image in the collection of images using edge detection, in step 1840. The vanishing directions are vectors representing the direction of parallel lines included in the collection images. The vanishing directions are derived from the directions of parallel three-dimensional lines estimated from the collection of two-dimensional images. Alternatively, the vanishing directions may be estimated from two-dimensional line intersections extracted from two-dimensional images in the collection of two-dimensional images. In one embodiment, mean shift clustering is used by the computerized reconstruction server to select vanishing directions for different views captured by the collection of two-dimensional images.

In step 1850, the computerized reconstruction server identifies each plane in the navigable three-dimensional scene based on the vanishing directions and the scene information. In an embodiment, the computerized reconstruction server determines a set of plane orientations based on a cross product of each possible pair of vanishing directions extracted from the collection of images. Additionally, dominant planes for the three dimensional scene may be identified by the computerized reconstruction server.

In step 1860, the computerized reconstruction server generates a Markov Random Field distribution to assign pixels to each plane based on minimization functions applied to the Markov Random Field distribution. The minimization functions optimize a global cost of assigning the pixel to a plane in the navigable three-dimensional scene. The pixels are included in a three-dimensional point cloud and assigned to each of the dominant planes based on, among other things, photo-consistency across multiple views included in the collection of images. In some embodiments, the pixels in the image vote for planes that correspond to camera orientation. Alternatively, the pixels in each image in the collection of images iteratively vote to determine the plane-pixel assignments that minimize the global cost. In certain embodiments, the minimization functions select cut costs for the Markov Random Field distribution graph that are constrained by the smoothness terms. The selected cut costs of the Markov Random Field distribution graph may be tallied by the computerized reconstruction server to arrive at a global cost.

In one embodiment, a portion of the global cost of plane-pixel assignments is represented by a smoothness term included in the minimization functions applied to a Markov Random Field distribution graph. The computerized reconstruction server may calculate smoothness terms in the Markov Random Field distribution graph having planes and pixels to prefer transitions corresponding to discontinuities at two-dimensional lines that are consistent with the vanishing directions orthogonal to the normal vector of an occluding plane. The computerized reconstruction server may calculate smoothness terms to penalize assigning a pixel in one image to a plane if the corresponding pixel in neighboring images did not choose the same plane. The computerized reconstruction server may calculate smoothness terms to prefer transitions corresponding to two-dimensional lines in the image.

The computerized reconstruction server renders the pixels on the assigned planes. The method ends in step 1870.

The computerized reconstruction server assigns pixels based on optimizations performed on a graph that represents the possible assignments of the pixels and planes. The computerized reconstruction server attempts to minimize the cost of each assignment between a pixel and plane. The cost of the assignment is represented by an objective function that include data terms and smoothness terms.

Figure 19:
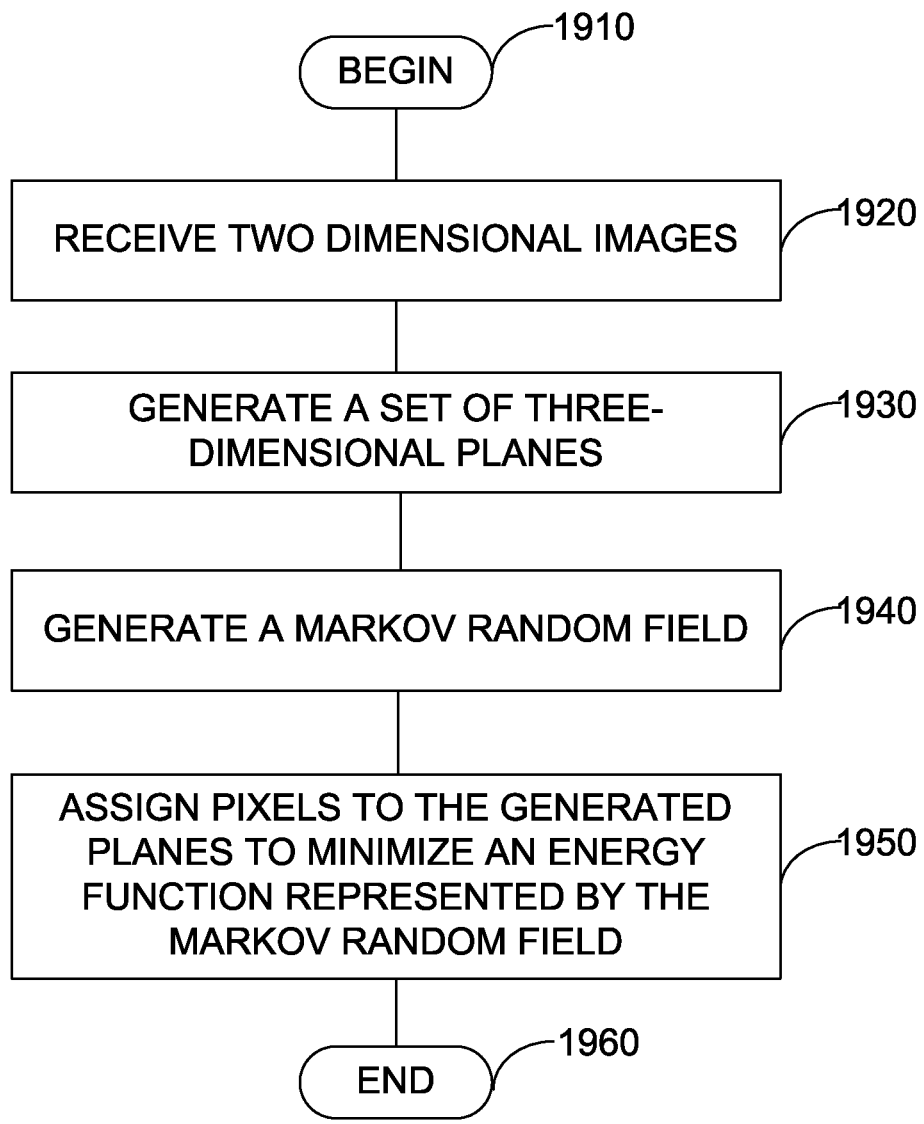
FIG. 19 is a logic diagram that illustrates a method that assigns pixels from two-dimensional images to three-dimensional planes when rendering a navigable three-dimensional scene from a collection of two dimensional images stored in an electronic database.

FIG. 19 is a logic diagram that illustrates a method that assigns pixels from two-dimensional images to three-dimensional planes when reconstruction a navigable three-dimensional scene from a collection of two dimensional images stored in an electronic database. The method begins in step 1910. In step 1920, the computerized reconstruction server receives the collection of two-dimensional images. The computerized reconstruction system generates a set of three-dimensional planes from scene information extracted from the two dimensional images, in step 1930. The scene information includes vanishing directions, lines, and three-dimensional points.

In turn, a Markov Random Field is generated by the computerized reconstruction server using the scene information and the generated three-dimensional planes, in step 1940. In step 1950, the computerized reconstruction system assigns pixels to the generated planes to minimize an energy function represented by the Markov Random Field, which provides depth maps for the two-dimensional images.

The Markov Random Field is optimized based on data terms that set conditions for assigning pixels and smoothness terms that set conditions for transitioning between planes. In some embodiments, during pixel assignment the computerized reconstruction system checks data terms for multi-view photo-consistency, geometric proximity of sparse three-dimensional points and lines, and free space violations derived from ray visibility of the three-dimensional points and lines. The data terms penalize assigning a pixel to a plane that would occlude a three-dimensional point or line that was observed in the image or the data terms encourage assigning a pixel to a plane that is consistent with a three-dimensional point or line that was observed in the image. In another embodiment, the data terms penalize assigning a pixel in one image to a plane if the corresponding pixel in neighboring images does not choose the same plane during an iterative pass on each two-dimensional image in the collection of two-dimensional images.

The smoothness terms prefer transitions between planes along the lines where the planes intersect. The smoothness terms also prefer transitions corresponding to discontinuities at two-dimensional lines that are consistent with the vanishing directions orthogonal to the normal vector of an occluding plane. The smoothness terms prefer transitions corresponding to two-dimensional lines in the image. The smoothness terms penalize assigning a pixel in one image to a plane if the corresponding pixel in neighboring images did not choose the same plane during a simultaneous pass on two-dimensional images in the collection of two-dimensional images.

The depth maps are generated by the computerized reconstruction system based on the pixel-plane assignments and are used to render a navigable three dimensional scene. In some embodiments, the computerized reconstruction system corrects the depth map and boundaries by identifying occlusion lines and crease lines. A three dimensional scene is rendered by the computerized reconstruction server using the depth map and projections of the two dimensional images. The two-dimensional image projections are cross faded to allow smooth view interpolation for each of the two-dimensional images in the collection that are part of the three-dimensional scene. The method ends in step 1960.

In summary, a computerized reconstruction server and client that execute automatic methods for computing piecewise planar, dense depth maps that are used for image-based rendering of large unordered two-dimensional images are provided. The three-dimensional scenes rendered by the computerized reconstruction server are reliable and photorealistic because the computerized reconstruction server exploits global scene information to generated the three-dimensional scene. The computerized reconstruction server recovers a set of dominant scene planes based on robust plane-fitting of three-dimensional points and lines while utilizing strong vanishing directions to infer plane orientations. The Markov Random Field (MRF) graph and corresponding optimization are executed by the computerized reconstruction server to generate piecewise planar depth maps that incorporate geometric constraints derived from discontinuities for polygonal and rectilinear shapes included in the two-dimensional images. Furthermore, ray visibility of three-dimensional points and lines are used by the computerized reconstruction server to enforce free space constraints and holes are minimized in scenes with non-Lambertian and textureless surfaces.

The foregoing descriptions of the embodiments of the invention are illustrative, and modifications in configuration and implementation are within the scope of the current description. For instance, while the embodiments of the invention are generally described with relation to FIGS. 1-19, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

We claim:

1. A computer-implemented method to select planes that are used to render a navigable three-dimensional scene from a collection of images stored in an electronic database, the computer-implemented method comprising:
   receiving, by a computer processor, the collection of images from the electronic database;
   extracting, by the computer processor, scene information from the collection of images;
   detecting, by the computer processor, vanishing directions within each image in the collection of images using edge detection and two-dimensional line segment extraction to form orthogonal triplets having at least two orthogonal vanishings directions;
   identifying, by the computer processor, each plane in the navigable three-dimensional scene based on the vanishing directions and the scene information; and
   generating, by the computer processor, a Markov Random Field distribution to assign pixels to each plane based on minimization functions applied to the Markov Random Field distribution to optimize a global cost of assigning the pixel to a plane in the navigable three-dimensional scene, wherein a portion of the global cost of plane-pixel assignments is represented by smoothness terms included in the minimization functions applied to a Markov Random Field distribution graph, the smoothness terms are calculated to prefer transitions between planes at pixels corresponding to discontinuities at two-dimensional lines that are consistent with the vanishing directions orthogonal to the normal vector of an occluding plane.

2. The computer-implemented method of claim 1, wherein the scene information includes camera calibrations, a three-dimensional point cloud, three-dimensional line segments, and data for multi-view correspondence of points and lines.

3. The computer-implemented method of claim 2, wherein mean shift clustering is used to detect the vanishing directions for different views captured by the collection of images.

4. The computer-implemented method of claim 1, wherein parallel lines extracted from the collection of images are used to detect the vanishing directions.

5. The computer-implemented method of claim 1, further comprising: determining a set of plane orientations based on a cross product of each possible pair of vanishing directions extracted from the collection of images.

6. The computer-implemented method of claim 1, further comprising: calculating smoothness terms in a Markov Random Field distribution graph to penalize assignment of a pixel in one image to a plane if the corresponding pixel in neighboring images did not choose the same plane.

7. The computer-implemented method of claim 1, further comprising:
calculating smoothness terms in the Markov Random Field distribution graph to prefer transitions corresponding to two-dimensional lines or two-dimensional line segments in the image.

8. The computer-implemented method of claim 1, wherein pixels in each image in the collection of images iteratively vote to determine the plane-label assignments that minimize the global cost.

9. The computer-implemented method of claim 1, wherein the minimization functions select cut costs in the Markov Random Field distribution graph that are constrained by the smoothness terms.

10. One or more computer-readable memories storing computer-executable instructions to perform a method that assigns pixels from two-dimensional images to three-dimensional planes when rendering a navigable three-dimensional scene from a collection of two dimensional images stored in an electronic database, the method comprising:
receiving the collection of two-dimensional images;
generating a set of three-dimensional planes from scene information extracted from the two dimensional images;
generating a Markov Random Field using the scene information and the generated three-dimensional planes;
assigning pixels to the generated planes to minimize an energy function represented by the Markov Random Field, which provides depth maps for the two-dimensional images, wherein data terms penalize assigning a pixel in one image to a plane if the corresponding pixel in neighboring images did not choose the same plane during an iterative pass on each two-dimensional image; and
rendering a three dimensional scene using the depth map and projections of the two dimensional images onto their corresponding depth maps, wherein cross fading between multiple two dimensional images allows smooth view interpolation for each of the two dimensional images in the collection.

11. The one or more computer-readable memories of claim 10, wherein the depth maps are used to render a navigable three dimensional scene.

12. The one or more computer-readable memories of claim 10, further comprising: correcting the depth map and boundaries by identifying occlusion edges and crease edges.

13. The one or more computer-readable memories of claim 10, wherein assigning pixels to the generated planes to minimize an energy function represented by the Markov Random Field further comprises: accounting for multiview-photo consistency, geometric proximity of sparse three-dimensional points and lines, and free space violations derived from ray visibility of the three-dimensional points and lines.

14. The one or more computer-readable memories of claim 13, wherein assigning pixels to the generated planes to minimize an energy function represented by the Markov Random Field further comprises: optimizing the Markov Random Field based on data terms that set conditions for assigning pixels and smoothness terms that set conditions for transitioning between planes.

15. The one or more computer-readable memories of claim 14, wherein the smoothness terms comprise at least one of the following smoothness terms: smoothness terms that prefer transitions corresponding to discontinuities at two-dimensional lines that are consistent with the vanishing directions orthogonal to the normal vector of an occluding plane, smoothness terms that prefer transitions corresponding to two-dimensional lines in the image, or smoothness terms that penalize assigning a pixel in one image to a plane if the corresponding pixel in neighboring images did not choose the same plane during a simultaneous pass on all images in the collection of two-dimensional images.

16. The one or more computer-readable memories of claim 10, wherein the scene information includes vanishing directions, lines, and three-dimensional points.

17. A computer system having memories and processors that are configured to generate a navigable three dimensional scene from a collection of two dimensional images, the computer system comprising:
a plane generator configured to generate a set of three-dimensional planes from the scene information extracted from the two dimensional images;
an optimization engine configured to estimate a depth map for each of the two dimensional images and to define global and local boundary constraints for assigning pixels from the two dimensional images to the generated planes; and
a reconstruction engine to create multiple planar polygons from the generated planes, interpolate views, and cross fade views from each image in the collection based on the depth maps for the three dimensional scene.

18. The computer system of claim 17, wherein assigning pixels to the generated planes minimizes an energy function represented by a Markov Random Field and comprises:
accounting for multiview-photo consistency, geometric proximity of sparse three-dimensional points and lines, and free space violations derived from ray visibility of the three-dimensional points and lines; and
optimizing the Markov Random Field based on data terms that set conditions for assigning pixels and smoothness terms that set conditions for transitioning between planes.

* * * * *